United States Patent
Chan et al.

(10) Patent No.: US 9,555,389 B2
(45) Date of Patent: Jan. 31, 2017

(54) GAS DISTRIBUTOR NOZZLES

(71) Applicant: KELLOGG BROWN & ROOT LLC, Houston, TX (US)

(72) Inventors: Ting Yee Chan, Bellaire, TX (US); Phillip K. Niccum, Houston, TX (US); Steven Arthur Tragesser, Houston, TX (US); Raymond Herbrich, Houston, TX (US); Christopher Flint, Kingwood, TX (US)

( * ) Notice: Subject to any disclaimer, the term of this patent is extended or adjusted under 35 U.S.C. 154(b) by 0 days.

(21) Appl. No.: 14/023,252

(22) Filed: Sep. 10, 2013

(65) Prior Publication Data

US 2014/0271414 A1    Sep. 18, 2014

Related U.S. Application Data

(60) Provisional application No. 61/780,742, filed on Mar. 13, 2013.

(51) Int. Cl.
*B01J 19/26*    (2006.01)
*B05B 1/00*    (2006.01)

(52) U.S. Cl.
CPC ............... *B01J 19/26* (2013.01); *B05B 1/005* (2013.01)

(58) Field of Classification Search
CPC ................................... B01J 19/26; B05B 1/00
USPC ......................................... 422/144, 607, 220
See application file for complete search history.

(56) References Cited

U.S. PATENT DOCUMENTS

| 3,974,091 | A | * | 8/1976 | Parker et al. | .............. | 502/41 |
| 4,460,130 | A | * | 7/1984 | Baumann et al. | .......... | 239/559 |
| 5,171,540 | A | * | 12/1992 | Wells et al. | ............... | 422/143 |
| 6,076,810 | A | * | 6/2000 | Chang et al. | ............... | 261/77 |
| 2005/0019228 | A1 | * | 1/2005 | Myers et al. | ............. | 422/139 |

* cited by examiner

*Primary Examiner* — Huy-Tram Nguyen
(74) *Attorney, Agent, or Firm* — Gary M. Machetta

(57) ABSTRACT

Systems and methods for injecting gas into a fluidized bed of particles are provided. The system can include a gas distribution system. The gas distribution system can include a header having a flow passage and a nozzle body coupled to the header. The nozzle body can have an inlet end in fluid communication with the flow passage and an outlet end positioned outside of the header. The nozzle body can have a longitudinal axis that is substantially perpendicular to a direction of flow through the flow passage. The nozzle body can have an orifice positioned between the inlet end and the outlet end.

15 Claims, 12 Drawing Sheets

GAS DISTRIBUTOR NOZZLES

CROSS-REFERENCE TO RELATED APPLICATION

This application claims priority to U.S. Provisional Patent Application having Ser. No. 61/780,742, filed on Mar. 13, 2013, which is incorporated by reference herein.

BACKGROUND

Field

Embodiments described generally relate to systems and methods for injecting a fluid into a fluidized bed of solid particles. More particularly, such embodiments relate to nozzles used to inject a fluid into a fluidized bed of solid particles.

Description of the Related Art

Fluidized beds of solid particles are used in many refining and chemical processes to uniformly mix a gas with the solid particles to support a chemical reaction or other process. A variety of gas distribution systems, including, but not limited to, plate grids, pipe grids, and pipe rings, can be used to inject gases into a vessel containing solid particles to "fluidize" the bed.

In many gas distribution systems, a plate and/or pipe is used as a header to distribute pressurized gas among an arrangement of outlets. The outlets can be fitted with nozzles selected to provide a pressure drop as the gas is injected into the bed. The pressure drop across the nozzles allows gas within the header to be evenly distributed among all of the nozzles.

One type of nozzle that can be used in a gas distribution system is a "Borda" Tube nozzle. A simple Borda Tube nozzle includes a straight tube with a concentric outlet positioned proximate to an outer surface of the header. The opposite end of the straight tube, which is positioned within the header, has a concentric inlet that draws gas from the header. The inlet can be fitted with an orifice sized so as to generate the desired pressure drop across the nozzle.

One problem with conventional Borda Tube nozzles is erosion of the nozzle outlet by the solid particles in the fluidized bed. As gas is injected into a fluidized bed, fluid pressure within the bed fluctuates due to the turbulent nature of the bed and the movement of gas through the bed. This fluctuation of fluid pressure can force solids to migrate into the nozzle outlets, which can cause erosion of the nozzle. Erosion of the nozzles can affect the performance of the gas distribution system, eventually necessitating repair or replacement of the system.

This erosion can be especially problematic where the nozzle is oriented substantially perpendicular to flow through the header. As gas in the header flows across the nozzle inlet it has to change direction to move through the nozzle. This "crossflow" of gas relative to the nozzle can create an uneven velocity profile at the nozzle outlet that can allow solid particles to migrate into the nozzle outlet causing erosion.

There is a need, therefore, for improved systems and methods for injecting gas into fluidized beds of particles.

DETAILED DESCRIPTION

Systems and methods for injecting gas into a fluidized bed of particles or solids are provided. The system can include a gas distribution system. The gas distribution system can include a header having a flow passage and a nozzle body coupled to the header. The nozzle body can have an inlet end in fluid communication with the flow passage and an outlet end positioned outside of the header. The nozzle body can have a longitudinal axis that is substantially perpendicular to a direction of flow through the flow passage. The nozzle body can have an orifice positioned between the inlet end and the outlet end.

The nozzles discussed and described herein are illustrated as having nozzle body and orifice flow passageways with circular or substantially circular cross-sections. It should be understood, however, that flow passageways with other cross-sectional shapes, including, but not limited to, elliptical, oval, triangular, rectangular, hexagonal, octagonal, other polygonal shapes, or any combination thereof, can be used. References made herein to diameters are understood to be an equivalent diameter, e.g., an average cross-sectional length, in those embodiments using non-circular flow passageways.

Figure 1:
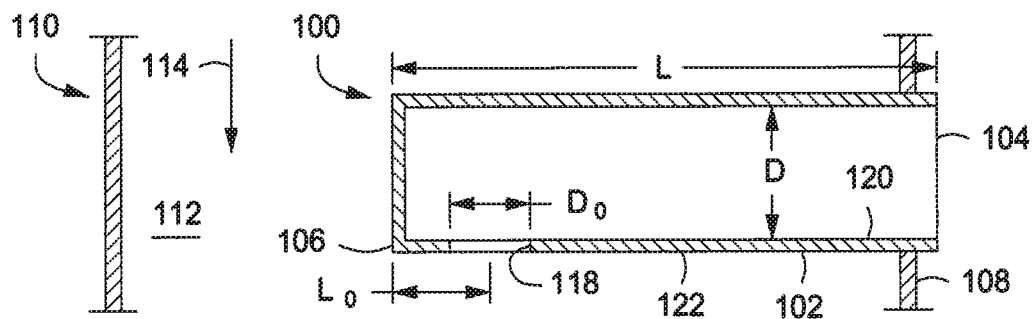
FIG. 1 depicts a sectional view of an illustrative nozzle having an intermediate orifice, according to one or more embodiments described.

FIG. 1 depicts an illustrative injection nozzle 100 nozzle having an orifice 118, according to one or more embodiments. The injection nozzle 100 can include a nozzle body 102 having an outlet end 104 and an inlet end 106. The nozzle body 102 can extend through and be coupled to the wall 108 of a header 110 so that the outlet end 104 is outside of the header 110. The inlet end 106 of the nozzle body 102 can be positioned in a flow passage 112 of the header 110 such that the longitudinal axis of the nozzle body 102 is substantially perpendicular to the direction of flow 114 through the flow passage 112. The outlet end 104 can define an outlet orifice or opening through which a fluid or gas can flow through. The inlet end 106 can be solid (shown) or can define one or more inlet orifices (not shown) through which a fluid or gas can flow.

The wall 120 of the nozzle body 102 can define the orifice 118 at a location along the nozzle body 102 between the inlet end 106 and outlet end 104. As such, the orifice 118 can also be referred to as an "intermediate" orifice. The orifice 118 can be positioned on a side of the nozzle body 102 downstream in relation to the direction of flow 114, or a downstream side 122 of the injection nozzle 100. Although not shown, the orifice 118 can also be positioned on a side of the nozzle body 102 upstream in relation to the direct of flow 114 or any other side of the nozzle body 102, e.g., a side of the nozzle body 102 perpendicular to the direction of flow 114. The orifice 118 can be sized and positioned so as to promote a substantially uniform velocity profile across the outlet end 104 and the desired pressure drop across the nozzle 100. For example, by positioning the orifice 118 on the downstream side 122 of the nozzle body 102, the flow through the orifice 118 can act to shift the maximum velocity away from the inner surface 120 of the nozzle body 102 and contribute to a more even velocity profile across the nozzle body 102 and across the outlet end 104.

The nozzle body 102 can be a tubular body having a ratio of length (L) to inside diameter (D) from a low of about 2, about 4, or about 6 to a high of about 10, about 15, or about 20. For example, the nozzle body 102 can be a tubular body having a ratio of length (L) to inside diameter (D) from about 4 to about 6, about 5 to about 7, about 6 to about 8, about 7 to about 9, or about 8 to about 10. A center of the orifice 118 can be located a distance ($L_o$) from the inlet end 106. The length of the distance ($L_o$) can be equal to the length of the diameter of the orifice 118 "orifice diameter" or "$D_o$" times a number from a low of about 0.5, about 1, about 2, or about 4 to a high of about 5, about 10, about 15, or about 20. For example, the center of the orifice 118 can be located at a distance ($L_o$) from the inlet end 106 that can be from about 0.5 to about 2, about 1 to about 2.5, about 2 to about 4, about 3 to about 5, about 4 to about 6, about 2.5 to about 4.5, or about 3.5 to about 5.5 times the side orifice diameter ($D_o$).

The flow passage 112 can contain a fluid or gas having a velocity from a low of about 0.1 m/s, about 1 m/s, about 5 m/s, about 10 m/s, or about 20 m/s to a high of about 40 m/s, about 60 m/s, about 80 m/s, about 90 m/s, or about 100 m/s. The fluid or gas within the flow passage 112 can be at a pressure from a low of about 7 kPa, about 50 kPa, about 100 kPa, about 200 kPa, or about 300 kPa to a high of about 500 kPa, about 700 kPa, about 800 kPa, about 900 kPa, or about 1,000 kPa. The injection nozzle 100 can be sized and configured so as to create a pressure drop from a low of about 0.1 kPa, about 1 kPa, about 5 kPa, about 10 kPa, or about 20 kPa to a high of about 30 kPa, about 40 kPa, about 50 kPa, about 60 kPa, or about 70 kPa. The injection nozzle can also cause an outlet velocity profile from a low of about 1 m/s, about 4 m/s, about 8 m/s, about 15 m/s, or about 25 m/s to a high of about 50 m/s, about 70 m/s, about 90 m/s, about 95 m/s, or about 100 m/s.

Figure 2:
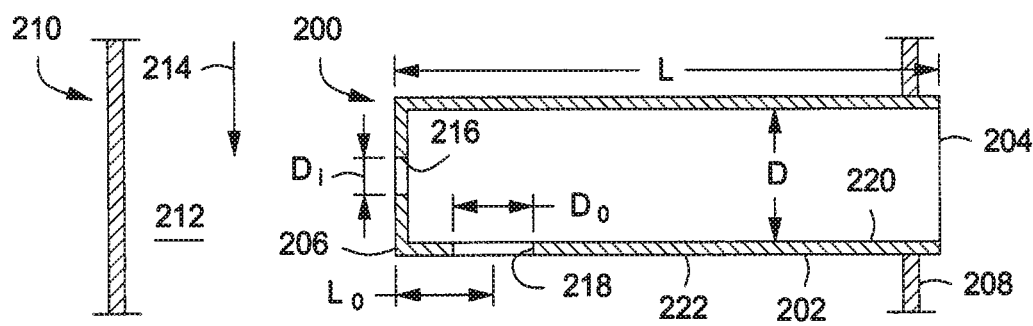
FIG. 2 depicts a sectional view of an illustrative nozzle having an intermediate orifice and an inlet end orifice, according to one or more embodiments described.

FIG. 2 depicts an illustrative injection nozzle 200 having an orifice 218 and an inlet end orifice 216, according to one or more embodiments. The injection nozzle 200 can include a nozzle body 202 having an outlet end 204 and an inlet end 206. The nozzle body 202 can extend through and be coupled to the wall 208 of a header 210 so that the outlet end 204 is outside of the header 210. The inlet end 206 of the nozzle body 202 can be positioned in a flow passage 212 of the header 210 so that the longitudinal axis of the nozzle body 202 is substantially perpendicular to the direction of flow 214 through the flow passage 212.

The wall 220 of the nozzle body 202 can define the orifice 218 at a location along the nozzle body 202 between the inlet end 206 and outlet end 204. As such, the orifice 218 can also be referred to as an "intermediate" orifice. The orifice 218 can be positioned on the downstream side 222 of the nozzle body 202. Although not shown, the orifice 218 can also be positioned on the upstream side of the nozzle body 202 or any other side of the nozzle body 202, e.g., a side of the nozzle perpendicular to the direction of flow 214. The orifice 218 can be sized and positioned so as to promote a substantially uniform velocity profile across the outlet end 204 and the desired pressure drop across the nozzle 200.

By positioning the orifice 218 on the downstream side 222 of nozzle body 202, the flow through the orifice 218 can act to shift the maximum velocity away from the inner surface 220 of the nozzle body 202 and contribute to a more even velocity profile across the nozzle body 202 and across the outlet end 204. The injection nozzle 200 can also include the inlet orifice 216 defined by the inlet end 206 such that the flow into the nozzle 200 can be through both the orifice 218 and the inlet orifice 216. For example, a first portion of the flow into the nozzle body 202 can flow through the inlet orifice 216 and a second portion of the flow into the nozzle body 202 can flow through the orifice 218.

The nozzle body 202 can be a tubular body having a ratio of length (L) to inside diameter (D) from a low of about 2, about 4, or about 6 to a high of about 10, about 15, or about 20. For example, the nozzle body 202 can be a tubular body having a ratio of length (L) to inside diameter (D) from about 4 to about 6, about 5 to about 7, about 6 to about 8, about 7 to about 9, or about 8 to about 10. A center of the orifice 218 can be located a distance ($L_o$) from the inlet end 206. The length of the distance ($L_o$) can be equal to the length of the diameter of the orifice 218 "orifice diameter" or "$D_o$" times a number from a low of about 0.5, about 2, about 4, or about 6 to a high of about 8, about 10, about 15, or about 20. For example, the center of the orifice 218 can be located at a distance ($L_o$) from the inlet end 206 that can be from about 0.5 to about 2, about 1 to about 2.5, about 2 to about 3, about 2 to about 4, about 2.5 to about 3.5, about 4 to about 6, or about 4.5 to about 5.5 times the diameter or $D_o$ of the orifice 218.

If both the orifice 218 and the inlet orifice 216 are present, a ratio of the inside diameter (D) to the inlet diameter (D) of inlet orifice 216 can be from a low of about 1, about 5, about 10, or about 25 to a high of about 50, about 75, about 90, or about 100. For example, the ratio of the inside diameter (D) to the inlet diameter ($D_i$) of inlet orifice 216 can be about 2 to about 15, or about 15 to about 35, or about 35 to about 50.

The flow passage 212 can contain a fluid or gas having a velocity from a low of about 0.1 m/s, about 1 m/s, about 5 m/s, about 10 m/s, or about 20 m/s to a high of about 40 m/s, about 60 m/s, about 80 m/s, about 90 m/s, or about 100 m/s. The fluid or gas within the flow passage 212 can be at a pressure from a low of about 7 kPa, about 50 kPa, about 100 kPa, about 200 kPa, or about 300 kPa to a high of about 500 kPa, about 700 kPa, about 800 kPa, about 900 kPa, or about 1,000 kPa. The injection nozzle 200 can be sized and configured so as to create a pressure drop from a low of about 0.1 kPa, about 1 kPa, about 5 kPa, about 10 kPa, or about 20 kPa to a high of about 30 kPa, about 40 kPa, about 50 kPa, about 60 kPa, or about 70 kPa. The injection nozzle can also cause an outlet velocity profile from a low of about 1 m/s, about 4 m/s, about 8 m/s, about 15 m/s, or about 25 m/s to a high of about 50 m/s, about 70 m/s, about 90 m/s, about 95 m/s, or about 100 m/s.

Figure 3:
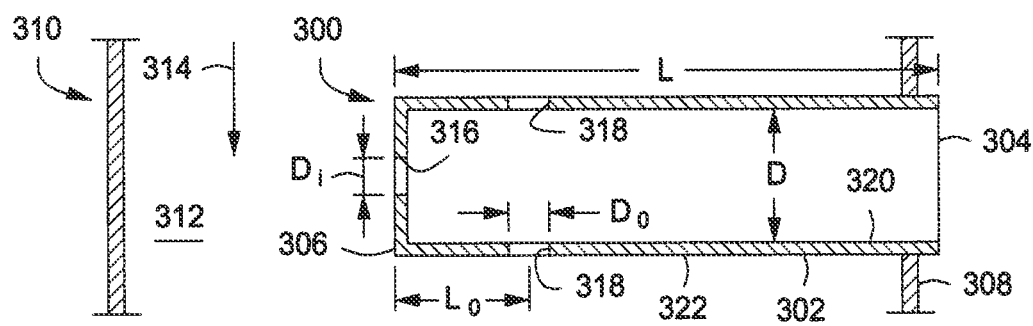
FIG. 3 depicts a sectional view of an illustrative nozzle having a plurality of intermediate orifices and an inlet end orifice, according to one or more embodiments described.

FIG. 3 depicts an illustrative injection nozzle 300 having a plurality of orifices 318 and an inlet end orifice 316, according to one or more embodiments. The injection nozzle 300 can include a nozzle body 302 having an outlet end 304 and an inlet end 306. The nozzle body 302 can extend through and be coupled to the wall 308 of a header 310 so that the outlet end 304 can be outside of the header 310. The inlet end 306 of the nozzle body 302 can be positioned in a flow passage 312 of the header 310 so that the longitudinal axis of the nozzle body 302 can be substantially perpendicular to the direction of flow 314 through the flow passage 312.

The inlet end 306 of the nozzle body 302 can define the inlet end orifice 316. The nozzle body 302 can also include the plurality of orifices 318 (two are shown) defined by a wall 320 of the nozzle body 302. The orifices 318 can be positioned at a location along the nozzle body 302 between the inlet end 306 and outlet end 304. As such, the orifices 318 can also be referred to as "intermediate" orifices. The orifices 318 can be uniformly or non-uniformly distributed about the circumference of the nozzle body 302. The orifices 318 can be uniformly or non-uniformly distributed along the length of the nozzle body 302 between the inlet end 306 and the outlet end 304. The orifices 318 can be sized and positioned so as to promote a substantially uniform velocity profile across the outlet end 304 and the desired pressure drop across the nozzle 300.

The flow of gas through inlet orifice 316 can generate higher velocities on the downstream side 322 of the nozzle body 302. By positioning the orifices 318 around the circumference of nozzle body 302, the flow through the orifices 318 can act to shift the flow through nozzle body 302 toward the centerline of the nozzle body 302 and can contribute to a more centered velocity profile across the nozzle body 302 and across at the outlet end 304.

The nozzle body 302 can be a tubular body having a ratio of length (L) to inside diameter (D) from a low of about 2, about 4, or about 6 to a high of about 10, about 15, or about 20. For example, the nozzle body 302 can be a tubular body having a ratio of length (L) to inside diameter (D) from about 4 to about 6, about 5 to about 7, about 6 to about 8, about 7 to about 9, or about 8 to about 10. The ratio of the inside diameter (D) to the inlet diameter ($D_i$) of inlet orifice 316 can be from a low of about 1, about 5, about 10, or about 25 to a high of about 50, about 75, about 90, or about 100. For example, the ratio of the inside diameter (D) to the inlet diameter ($D_i$) of inlet orifice 316 can be about 2 to about 15, about 15 to about 35, or about 35 to about 50.

There can be from 2, 4, or 6 to 10, 15, or 20 or more orifices 318 distributed about the circumference of the nozzle body 302. A ratio of the inside diameter (D) to the inlet diameter ($D_i$) of inlet orifice 318 can range from a low of about 1, about 5, about 10, or about 25 to a high of about 50, about 75, about 90, or about 100. For example, the ratio of the inside diameter (D) to the inlet diameter ($D_i$) can be about 2 to about 15, or about 15 to about 35, or about 35 to about 50. A center of the orifices 318 can be located a distance ($L_o$) from the inlet end 306. The length of the distance ($L_o$) can be equal to the length of the diameter of the orifices 318 "orifice diameter" or "$D_o$," times a number ranging from a low of about 0.5, about 2, about 4, or about 6 to a high of about 8, about 10, about 15, or about 20. For example, the centers of the orifices 318 can be located at a distance ($L_o$) from the inlet end 306 that can be from about 0.5 to about 2, about 1 to about 3, about 1.5 to about 3.5, about 2 to about 4, about 3 to about 5, about 4 to about 6, or about 4.5 to about 5.5 times the orifice diameter ($D_o$).

The flow passage 312 can contain a fluid or gas having a velocity from a low of about 0.1 m/s, about 1 m/s, about 5 m/s, about 10 m/s, or about 20 m/s to a high of about 40 m/s, about 60 m/s, about 80 m/s, about 90 m/s, or about 100 m/s. The fluid or gas within the flow passage 312 can be at a pressure from a low of about 7 kPa, about 50 kPa, about 100 kPa, about 200 kPa, or about 300 kPa to a high of about 500 kPa, about 700 kPa, about 800 kPa, about 900 kPa, or about 1,000 kPa. The injection nozzle 300 can be sized and configured so as to create a pressure drop from a low of about 0.1 kPa, about 1 kPa, about 5 kPa, about 10 kPa, or about 20 kPa to a high of about 30 kPa, about 40 kPa, about 50 kPa, about 60 kPa, or about 70 kPa. The injection nozzle can also cause an outlet velocity profile from a low of about 1 m/s, about 4 m/s, about 8 m/s, about 15 m/s, or about 25 m/s to a high of about 50 m/s, about 70 m/s, about 90 m/s, about 95 m/s, or about 100 m/s.

Figure 4:
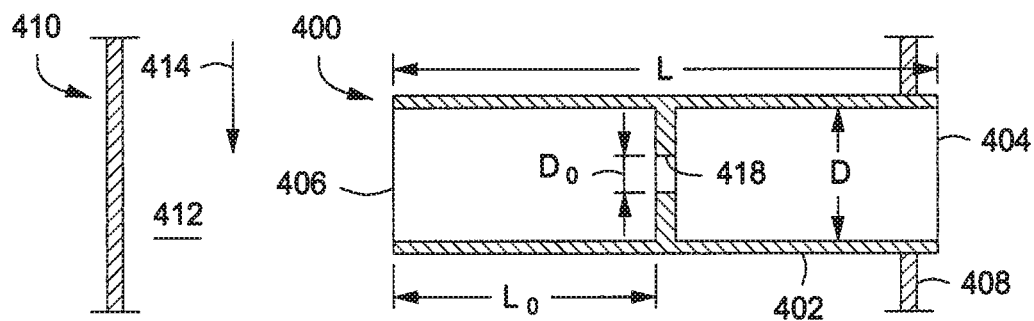
FIG. 4 depicts a sectional view of an illustrative nozzle having an intermediate concentric orifice, according to one or more embodiments described.

FIG. 4 depicts an illustrative injection nozzle 400 having a concentric orifice 418, according to one or more embodiments. The injection nozzle 400 can include a nozzle body 402 having an outlet end 404 and an inlet end 406. The nozzle body 402 can extend through and be coupled to the wall 408 of a header 410 so that the outlet end 404 can be outside of the header 410. The inlet end 406 of the nozzle body 402 can be positioned in a flow passage 412 of the header 410 so that the longitudinal axis of the nozzle body 402 can be substantially perpendicular to the direction of flow 414 through the flow passage 412.

The nozzle body 402 can include the orifice 418 positioned within the nozzle body 402 at a location along the nozzle body 402 between the inlet end 406 and outlet end 404. As such, the orifice 418 can also be referred to as an "intermediate" orifice. For example, the orifice 418 can be aligned with the centerline of the nozzle body 402 and longitudinally offset from the inlet end 406. In another example, the orifice 418 can be located within the nozzle body 402 at a position not in alignment with the centerline of the nozzle body 402 (not shown). The nozzle body 402 can also include a plurality of orifices 418 positioned therein (not shown). The orifice 418 can be sized and positioned so as to promote a substantially uniform velocity profile across the outlet end 404 and the desired pressure drop across the nozzle 400.

Positioning the orifice 418 at a longitudinally offset position relative to the inlet end 406 can create a shroud that can reduce the effect of the nozzle 400 being substantially perpendicular to the flow 414 through the flow passage 412. By positioning the orifice 418 away from direct interaction with the flow 414 in the flow passageway 412, the flow through the orifice 418 can be located substantially along the centerline of the nozzle body 402 and can contribute to a more centered velocity profile across the nozzle body 402 and at the outlet end 404.

The nozzle body 402 can be a tubular body having a ratio of length (L) to inside diameter (D) from a low of about 2, about 4, or about 6 to a high of about 10, about 15, or about 20. For example, the nozzle body 402 can be a tubular body having a ratio of length (L) to inside diameter (D) from about 4 to about 6, about 6 to about 8, about 8 to about 10. The orifice 418 can be located a distance ($L_o$) from the inlet end 406. The length of the distance ($L_o$) can be equal to the length of the diameter of the orifice 418 "orifice diameter" or "$D_o$," times a number ranging from a low of about 2, about 10, about 25, or about 30 to a high of about 60, about 80, about 90, or about 100. For example, the orifice 418 can be located at a distance ($L_o$) from the inlet end 406 that can be from about 4 to about 10, or about 10 to about 20, or about 20 to about 40 times the orifice diameter ($D_o$).

The flow passage 412 can contain a fluid or gas having a velocity from a low of about 0.1 m/s, about 1 m/s, about 5 m/s, about 10 m/s, or about 20 m/s to a high of about 40 m/s, about 60 m/s, about 80 m/s, about 90 m/s, or about 100 m/s. The fluid or gas within the flow passage 412 can be at a pressure from a low of about 7 kPa, about 50 kPa, about 100 kPa, about 200 kPa, or about 300 kPa to a high of about 500 kPa, about 700 kPa, about 800 kPa, about 900 kPa, or about 1,000 kPa. The injection nozzle 400 can be sized and configured so as to create a pressure drop from a low of about 0.1 kPa, about 1 kPa, about 5 kPa, about 10 kPa, or about 20 kPa to a high of about 30 kPa, about 40 kPa, about 50 kPa, about 60 kPa, or about 70 kPa. The injection nozzle can also cause an outlet velocity profile from a low of about 1 m/s, about 4 m/s, about 8 m/s, about 15 m/s, or about 25 m/s to a high of about 50 m/s, about 70 m/s, about 90 m/s, about 95 m/s, or about 100 m/s.

Figure 5:
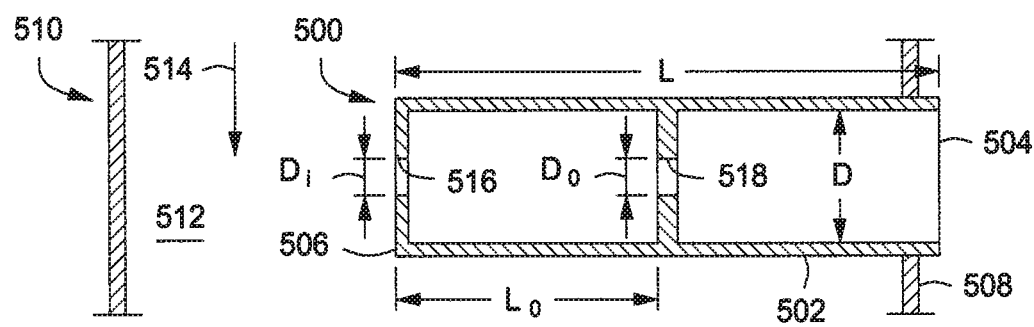
FIG. 5 depicts a sectional view of an illustrative nozzle having an intermediate concentric orifice and an inlet orifice, according to one or more embodiments described.

FIG. 5 depicts an illustrative injection nozzle 500 having a concentric orifice 518 and an inlet orifice 516, according to one or more embodiments. The injection nozzle 500 can include a nozzle body 502 having an outlet end 504 and an inlet end 506. The nozzle body 502 can extend through and be coupled to the wall 508 of a header 510 so that the outlet end 504 can be outside of the header 510. The inlet end 506 of the nozzle body 502 can be positioned in a flow passage 512 of the header 510 so that the longitudinal axis of the nozzle body 502 can be substantially perpendicular to the direction of flow 514 through the flow passage 512.

The inlet orifice 516 can be defined by the inlet end 506 of the nozzle body 502. The nozzle body 502 can also include the orifice 518 positioned within the nozzle body 502 at a location along the nozzle body 502 between the inlet end 506 and outlet end 504. As such, the orifice 518 can also be referred to as an "intermediate" orifice. The orifice 518 can be can be aligned with the centerline of the nozzle body 502 and longitudinally offset from the inlet end 506. In another example, the orifice 518 can be located within the nozzle body 502 at a position not in alignment with the centerline of the nozzle body 502 (not shown). The nozzle body 502 can also include a plurality of orifices 518 positioned therein (not shown). The orifice 518 can be sized and positioned so as to promote a substantially uniform velocity profile across the outlet end 504 and the desired pressure drop across the nozzle 500.

Positioning the orifice 518 in series with the inlet orifice 516 can reduce the effects of the nozzle 500 being substantially perpendicular to the flow 514 through the flow passage 512. By positioning the orifice 518 in series with inlet orifice 516 the flow through the orifice 518 can be located substantially along the centerline of the nozzle body 502 and can contribute to a more centered velocity profile across the nozzle body 502 and across the outlet end 504.

The nozzle body 502 can be a tubular body having a ratio of length (L) to inside diameter (D) from a low of about 2, about 4, or about 6 to a high of about 10, about 15, or about 20. For example, the nozzle body 502 can be a tubular body having a ratio of length (L) to inside diameter (D) from about 4 to about 6, about 6 to about 8, about 8 to about 10. The ratio of the inside diameter (D) to the inlet diameter ($D_i$) of inlet orifice 516 can be from a low of about 2, about 15, about 25, or about 40 to a high of about 65, about 85, about 95, or about 100. For example, the ratio of the inside diameter (D) to the inlet diameter ($D_1$) of inlet orifice 516 can be about 2 to about 15, or about 15 to about 35, or about 35 to about 50.

A ratio of the inside diameter (D) to the diameter of the orifice 518 "orifice diameter" or "$D_o$," can be from a low of about 1, about 5, about 10, or about 25 to a high of about 50, about 75, about 90, or about 100. For example, the ratio of the orifice diameter ($D_o$) to the inside diameter (D) can be about 2 to about 15, or about 15 to about 35, or about 35 to about 50. The orifice 518 can be located a distance ($L_o$) from the inlet end 506. The length of the distance ($L_o$) can be equal to the length of the orifice diameter ($D_o$) times a number from a low of about 2, about 15, about 25, or about 40 to a high of about 65, about 85, about 95, or about 100. For example, the orifice 518 can be located at a distance ($L_c$) from the inlet end 506 that can be from about 4 to about 10, or about 10 to about 20, or about 20 to about 40 times the orifice diameter ($D_o$).

The flow passage 512 can contain a fluid or gas having a velocity from a low of about 0.1 m/s, about 1 m/s, about 5 m/s, about 10 m/s, or about 20 m/s to a high of about 40 m/s, about 60 m/s, about 80 m/s, about 90 m/s, or about 100 m/s. The fluid or gas within the flow passage 512 can be at a pressure from a low of about 7 kPa, about 50 kPa, about 100 kPa, about 200 kPa, or about 300 kPa to a high of about 500 kPa, about 700 kPa, about 800 kPa, about 900 kPa, or about 1,000 kPa. The injection nozzle 500 can be sized and configured on as to create a pressure drop from a low of about 0.1 kPa, about 1 kPa, about 5 kPa, about 10 kPa, or about 20 kPa to a high of about 30 kPa, about 40 kPa, about 50 kPa, about 60 kPa, or about 70 kPa. The injection nozzle can also cause an outlet velocity profile from a low of about 1 m/s, about 4 m/s, about 8 m/s, about 15 m/s, or about 25 m/s to a high of about 50 m/s, about 70 m/s, about 90 m/s, about 95 m/s, or about 100 m/s.

Figure 6:
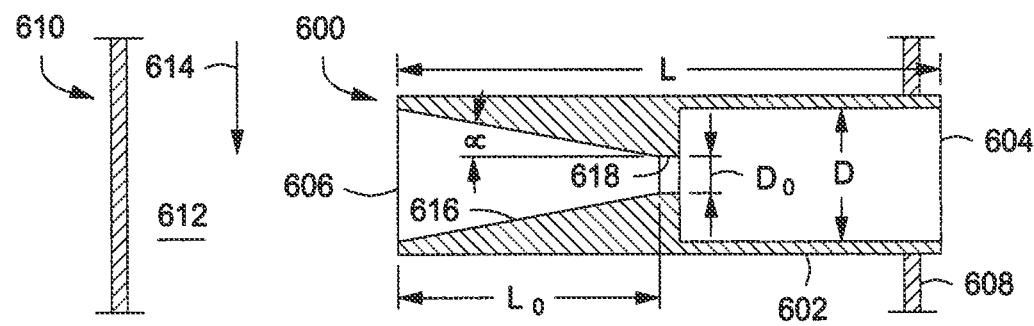
FIG. 6 depicts a sectional view of an illustrative nozzle having an intermediate concentric orifice with a tapered inlet, according to one or more embodiments described.

FIG. 6 depicts an illustrative injection nozzle 600 having a concentric orifice 618 with a tapered inlet 616, according to one or more embodiments. The injection nozzle 600 can include a nozzle body 602 having an outlet end 604 and an inlet end 606. The nozzle body 602 can extend through and be coupled to the wall 608 of a header 610 so that the outlet end 604 can be outside of the header 610. The inlet end 606 of the nozzle body 602 can be positioned in a flow passage 612 of the header 610 so that the longitudinal axis of the nozzle body 602 can be substantially perpendicular to the direction of flow 614 through the flow passage 612.

The nozzle body 602 can include an orifice 618 positioned within the nozzle body 602 at a location along the nozzle body 602 between the inlet end 606 and outlet end 604. As such, the orifice 618 can also be referred to as an "intermediate" orifice. The orifice 618 can be aligned with the centerline of the nozzle body 602 and longitudinally offset from the inlet end 606. In another example, the orifice 618 can be located within the nozzle body 602 at a position not in alignment with the centerline of the nozzle body 602 (not shown). The wall 616 of the nozzle body 602 can be tapered inward from inlet end 606 to the orifice 618. The orifice 618 can be sized and positioned so as to promote a substantially uniform velocity profile across the outlet end 604 and the desired pressure drop across the nozzle 600. Although not shown, the nozzle body 602 can include a plurality of orifices 618 defined therein.

Disposing the orifice 618 at a longitudinally offset position relative to the inlet end 606 can reduce the effects of the nozzle 600 being substantially perpendicular to the flow 614 through the flow passage 612. The taper on nozzle body 602 can direct the flow toward the orifice 618 no that the flow through the orifice 618 can be substantially aligned with the centerline of the nozzle body 602 and can contribute to a more centered velocity profile across the nozzle body 602 and at outlet end 604.

The nozzle body 602 can be a tubular body having a ratio of length (L) to inside diameter (D) from a low of about 2, about 4, or about 6 to a high of about 10, about 15, or about 20. For example, the nozzle body 602 can be a tubular body having a ratio of length (L) to inside diameter (D) from about 4 to about 6, about 6 to about 8, about 8 to about 10. The intermediate orifice 618 can be located a distance ($L_o$) from the inlet end 606. The length of the distance ($L_o$) can be equal to the length of the intermediate orifice diameter ($D_o$) times a number from a low of about 2, about 15, about 25, or about 40 to a high of about 65, about 85, about 95, or about 100. For example, the intermediate orifice 618 can be located at a distance ($L_o$) from the inlet end 606 that can be from about 4 to about 10, or about 10 to about 20, or about 20 to about 40 times the intermediate orifice diameter ($D_o$). The wall 616 of the nozzle body 602 can be tapered at an angle α between 2 and 45 degrees, between 5 and 35 degrees, or between 10 and 25 degrees.

The flow passage 612 can contain a fluid or gas having a velocity from a low of about 0.1 m/s, about 1 m/s, about 5 m/s, about 10 m/s, or about 20 m/s to a high of about 40 m/s, about 60 m/s, about 80 m/s, about 90 m/s, or about 100 m/s. The fluid or gas within the flow passage 612 can be at a pressure from a low of about 7 kPa, about 50 kPa, about 100 kPa, about 200 kPa, or about 300 kPa to a high of about 500 kPa, about 700 kPa, about 800 kPa, about 900 kPa, or about 1,000 kPa. The injection nozzle 600 can be sized and configured so as to create a pressure drop from a low of about 0.1 kPa, about 1 kPa, about 5 kPa, about 10 kPa, or about 20 kPa to a high of about 30 kPa, about 40 kPa, about 50 kPa, about 60 kPa, or about 70 kPa. The injection nozzle can also cause an outlet velocity profile from a low of about 1 m/s, about 4 m/s, about 8 m/s, about 15 m/s, or about 25 m/s to a high of about 50 m/s, about 70 m/s, about 90 m/s, about 95 m/s, or about 100 m/s.

While the angle between a longitudinal axis of the nozzle bodies 102, 202, 302, 402, 502, and/or 602 has been discussed and described as being substantially perpendicular, e.g., +/−5 degrees, to the direction of their respective flows 114, 214, 314, 414, 515, and 614, it should be understood that the angle can widely vary. For example, the angle between the longitudinal axis of the nozzle bodies 102, 202, 302, 402, 502, and/or 602 and respective flows 114, 214, 314, 414, 515, and 614 can be from a low of about 50 degrees, about 60 degrees, 70 degrees, about 75 degrees, about 80 degrees, or about 85 degrees to a high of about 95 degrees, about 100 degrees, about 105 degrees, about 110 degrees, about 115 degrees, about 125 degrees, or about 135 degrees. In another example, angle between the longitudinal axis of the nozzle bodies 102, 202, 302, 402, 502, and/or 602 can be from about 84 degrees to about 96 degrees, about 88 degrees to about 92 degrees, about 89 degrees to about 91 degrees, about 77 degrees to about 87 degrees, about 93 degrees to about 103 degrees, or about 85 degrees to about 95 degrees. In another example, the angle between the longitudinal axis of the nozzle bodies 102, 202, 302, 402, 502, and/or 602 can be about 85 degrees, about 86 degrees, about 87 degrees, about 88 degrees, about 89 degrees, about 90 degrees, about 91 degrees, about 92 degrees, about 93 degrees, about 94 degrees, or about 95 degrees.

Figure 7:
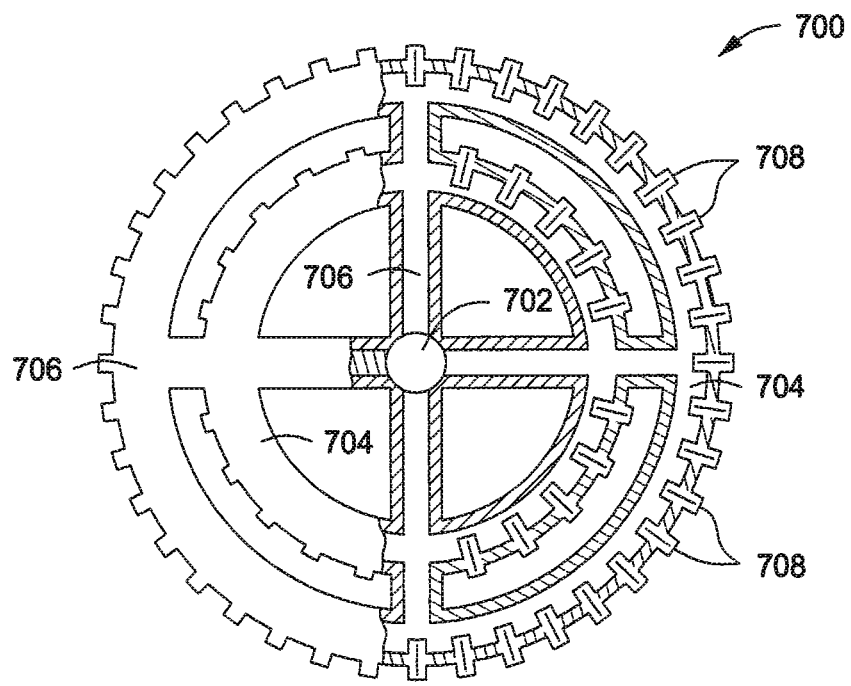
FIG. 7 depicts a partial sectional plan view of an illustrative pipe ring gas distribution system, according to one or more embodiments described.

FIG. 7 depicts an illustrative pipe ring gas distribution system 700, according to one or more embodiments. The gas distribution system 700 can include one or more gas inlets 702, one or more curvilinear headers 704, one or more interconnecting spokes 706, and one or more injection nozzles 708. The injection nozzles 708 can be or include any one or more of the injection nozzles 100, 200, 300, 400, 500, and/or 600 discussed and described above with reference to FIGS. 1-6. The interconnecting spokes 706 can provide fluid communication between the gas inlet 702 and the curvilinear headers 704. The injection nozzles 708 can be arranged on the curvilinear headers 704 to distribute fluid or gas. The injection nozzles 708 can extend horizontally from the curvilinear headers 704 or can be positioned at an angle above or below horizontal ranging from about 0 degrees to about 90 degrees, from about 5 degrees to about 75 degrees, from about 10 degrees to about 50 degrees, or about 15 degrees to about 35 degrees. The gas distribution system 700 can also be covered with a heat resistant lining, such as a refractory lining, that can protect the system from thermal, chemical, or erosive attack during operation.

Figure 8:
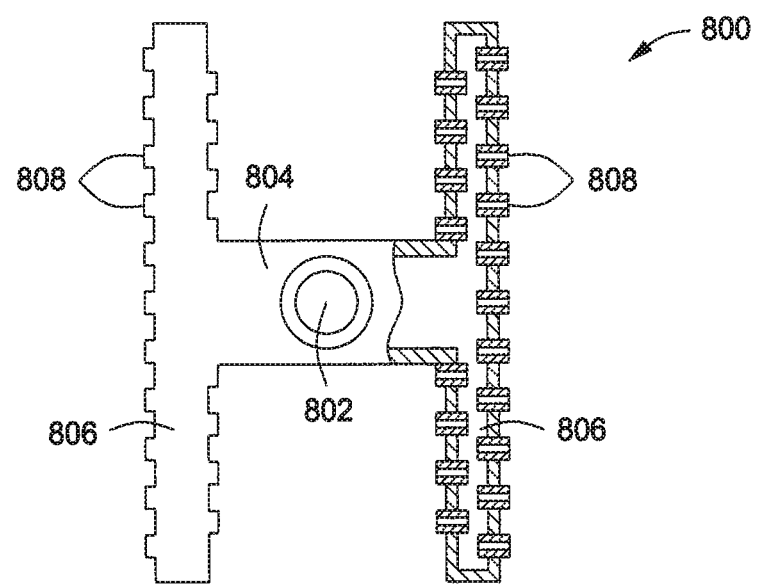
FIG. 8 depicts a partial sectional plan view of an illustrative pipe grid gas distribution system, according to one or more embodiments described.

FIG. 8 depicts a partial sectional plan view of an illustrative pipe grid gas distribution system 800, according to one or more embodiments. The gas distribution system 800 can include one or more gas inlets 802, one or more central manifolds 804, one or more nozzle headers 806, and one or more injection nozzles 808. The injection nozzles 808 can be or include any one or more of the injection nozzles 100, 200, 300, 400, 500, and/or 600 discussed and described above with reference to FIGS. 1-6. The central manifold 804 can provide fluid communication between the nozzle headers 806 and the gas inlet 802. The injection nozzles 808 can be arranged on the nozzle headers 806 to evenly distribute gas. The injection nozzles 808 can extend horizontally from the nozzle headers 804 or can be positioned at an angle above or below horizontal ranging from about 0 degrees to about 90 degrees, from about 5 degrees to about 75 degrees, from about 10 degrees to about 50 degrees, or about 15 degrees to about 35 degrees. The gas distribution system 800 can also be covered with a heat resistant lining, such as a refractory lining, that can help protect the system from thermal, chemical, and/or erosive attack during operation.

Gas distribution systems as described herein can be disposed in a vessel containing a bed of solid particles and used to distribute gas in the vessel to fluidize the bed of solid particles. Exemplary uses for gas distribution systems as described herein include, but are not limited to catalyst regenerators, polymerization reactors, and coal gasification systems.

One exemplary use of gas distribution systems as described herein can be in the regeneration of catalyst used in a fluid catalytic cracking (FCC) process. The FCC process utilizes solid catalysts to facilitate the cracking of heavy hydrocarbon streams to produce lighter hydrocarbon products. As a by-product of cracking, a carbonaceous coke can be deposited on the catalyst, which can lead to deactivation of the catalyst. The coke can be removed from the catalyst by a combustion process, known as catalyst regeneration.

Figure 9:
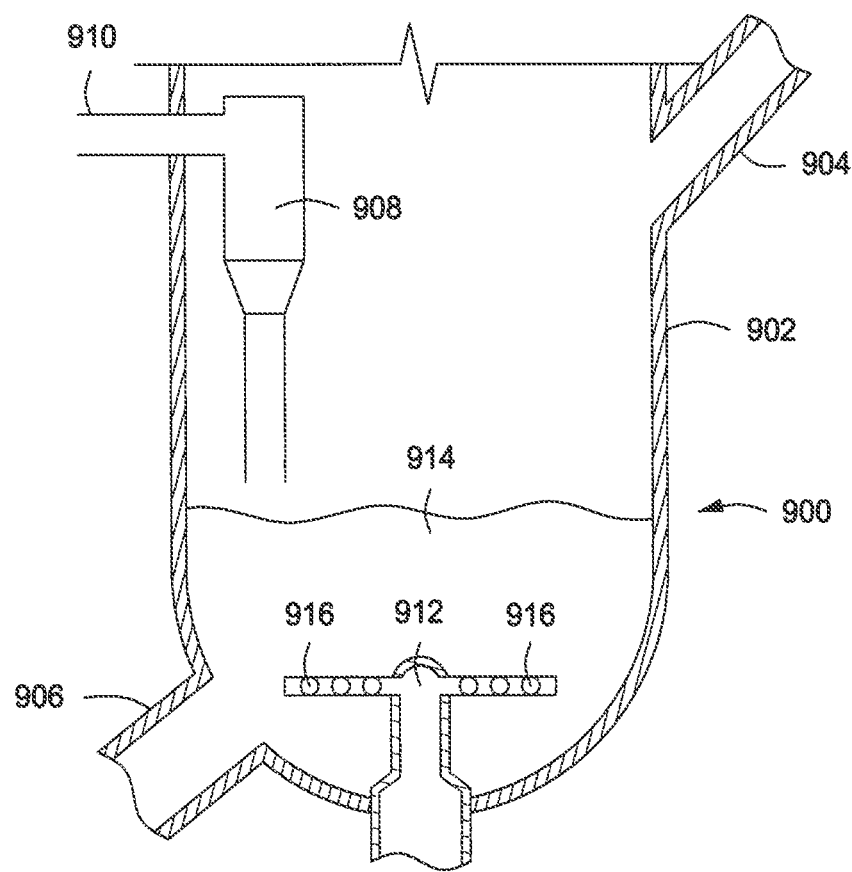
FIG. 9 depicts a schematic view of a catalyst regenerator, according to one or more embodiments described.

FIG. 9 depicts an illustrative catalyst regenerator 900, according to one or more embodiments. The regenerator 900 can include a regenerator vessel 902, one or more catalyst inlets 904, one or more catalyst outlets 906, one or more cyclones 908, one or more waste gas outlets 910, and one or more gas distribution systems 912. A coke-covered catalyst from an FCC reactor (not shown) can be supplied regenerator vessel 902 via the catalyst inlet 904 to form catalyst bed 914. In one or more embodiments, the regenerator 900 can be integrated into an FCC reactor vessel.

One or more oxidants can be supplied to the gas distribution system 912 and injected into the catalyst bed 914 through the injection nozzles 916. The injection nozzles 916 can be or include the injection nozzles 100, 200, 300, 400, 500, and/or 600 discussed and described above with reference to FIGS. 1-6. As used herein, an "oxidant" can refer to any compound or element suitable for oxidizing the coke on the surface of the catalyst. Such oxidants include, but are not limited to air, oxygen enriched air (air having an oxygen concentration greater than 21 wt %), oxygen, nitrogen enriched air (air having a nitrogen concentration less than 79 wt %), or any combination or mixture thereof.

The addition of the oxidant to the catalyst bed 914 can result in the oxidation and/or combustion of the coke on the surface of the catalyst into one or more waste gases including, but not limited to, carbon monoxide, carbon dioxide, hydrogen, water vapor, and/or combinations thereof. In an exemplary embodiment, the combustion temperatures in the regenerator 900 can be about 575° C. to about 800° C., or from about 600° C. to about 760° C., or from about 690° C. to about 725° C. In one or more embodiments, the regenerator 900 can also include a supplemental heater and/or a supplemental supply of fuel to maintain the desired combustion temperatures. Also the regenerator can include one or more catalyst coolers for removing excess heat generated in the combustion process.

The removal of the coke from the surface of the catalyst can reactivate and/or regenerate the catalyst. Regenerated catalyst can be removed from the regenerator 900 via catalyst outlet 906 and recycled to an FCC reactor (not shown). The waste gases produced by the combustion process can be routed through the cyclones 908 that can remove any catalyst suspended in the waste gas. The waste gases can then be removed from the regenerator 900 via waste gas outlet 910 to be recovered, reused, recycled, treated, and/or disposed of.

Figure 10:
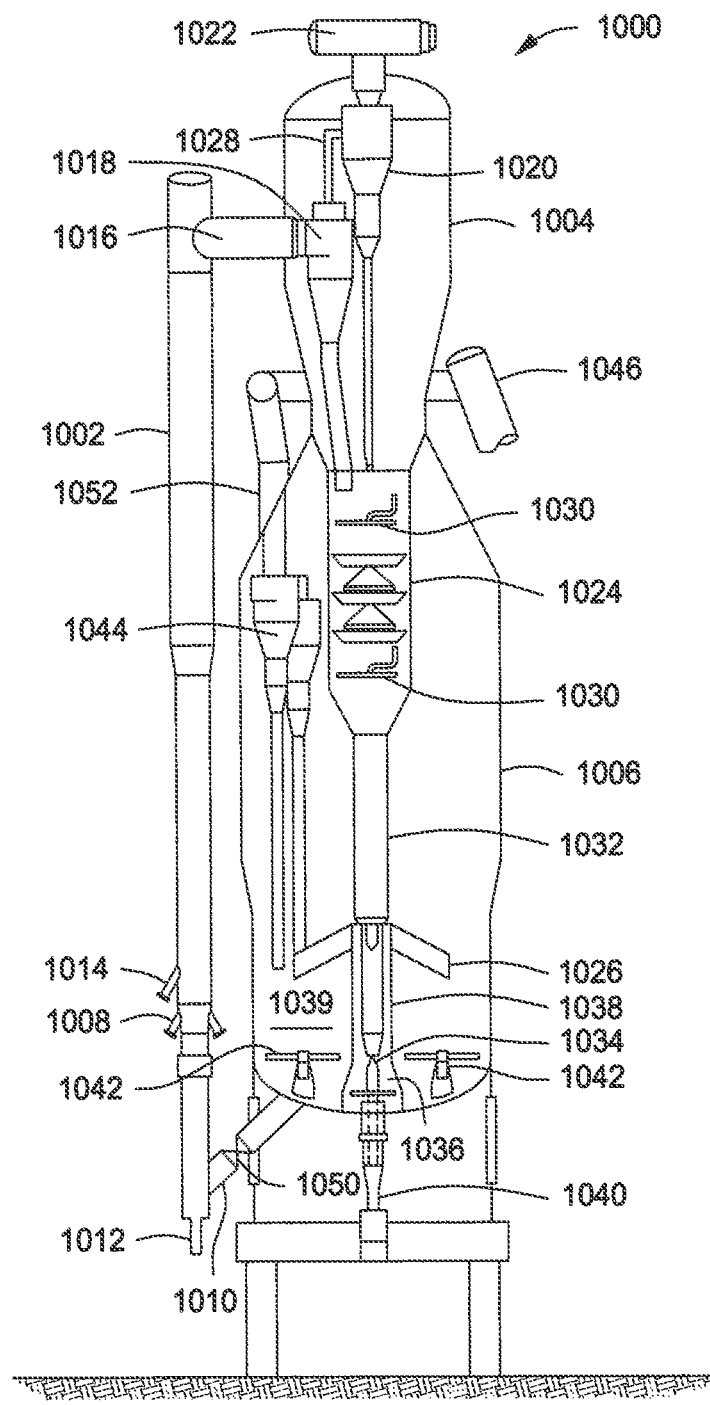
FIG. 10 depicts an illustrative fluidized catalytic cracking system, according to one or more embodiments described.

FIG. 10 depicts an illustrative fluid catalytic cracking (FCC) system 1000 for upgrading one or more hydrocarbons, according to one or more embodiments. The FCC system 1000 can include one or more riser reactors 1002, one or more disengagers 1004, and one or more regenerators or regenerator vessels 1006. The riser reactor 1002 can include any system, device or combination of systems and/or devices suitable for cracking of one or more hydrocarbon feeds in the presence of one or more catalysts. The riser reactor 1002 can operate at a temperature of from about 400° C. to about 750° C., about 425° C. to about 725° C., about 440° C. to about 700° C., about 450° C. to about 675° C., about 480° C. to about 650° C., or about 510° C. to about 565° C. The riser reactor 1002 can operate at a pressure from about 101 kPa to about 1,100 kPa; about 150 kPa to about 900 kPa; or from about 200 kPa to about 525 kPa.

The hydrocarbon feed ("first hydrocarbon feed") can be introduced to the riser reactor 1002 via line 1008. The first hydrocarbon feed can be mixed or otherwise combined with one or more catalysts supplied via line 1010 to produce a mixture or ("first mixture"). Steam via line 1012 can optionally be introduced to the riser reactor 1002. The first hydrocarbon feed in line 1008 can be or include one or more paraffinic hydrocarbons, one or more naphthenic hydrocarbons, one or more aromatic hydrocarbons, or any mixture thereof. The first hydrocarbon feed in line 1008 can include, but is not limited to, petroleum distillates, residual stocks, light cycle oils, heavy cycle oils, or the like. Illustrative first hydrocarbon feeds in line 1008 can include, but are not limited to, gas oils, vacuum gas oils, atmospheric resids, vacuum resids, or any mixture thereof. The first hydrocarbon feed can have an initial boiling point of about 300° C. or more, about 340° C. or more, about 380° C. or more, about 400° C. or more, about 425° C. or more, about 450° C. or more, or about 500° C. or more at atmospheric pressure.

The first hydrocarbon feed in line 1008 can be liquid or partially or completely vaporized prior to introduction to the riser reactor 1002. For example, the first hydrocarbon feed in line 1008 can be about 0 wt % or more, about 5 wt % or more, about 10 wt % or more, about 15 wt % or more, about 25 wt % or more, about 50 wt % or more, about 75 wt % or more, about 90 wt % or more, about 95 wt % or more, about 99 wt % or more, or about 99.9 wt % or more vaporized prior to introduction to the riser reactor 1002. The first hydrocarbon feed in line 1008 can be introduced to the riser reactor 1002 at ambient or elevated temperature. For example, the temperature of the first hydrocarbon feed in line 1008 can be a minimum of about 40° C., about 100° C., about 200° C., about 400° C., about 425° C., or about 500° C.

The steam that can optionally be introduced via line 1012 can be saturated steam or superheated steam. For example, the steam line 1012 can be saturated steam and have a minimum supply pressure of about 135 kPa, about 310 kPa; about 510 kPa; about 720 kPa; about 1,130 kPa; or about 1,250 kPa. In another example, the steam in line 1012 can be superheated steam and have a minimum superheat of about 15° C., about 30° C., about 45° C., about 60° C., or about 90° C.

The one or more catalysts supplied via line 1010 can include catalyst suitable for catalytically cracking the first and/other, yet to be described, hydrocarbon feeds to provide one or more olefinic hydrocarbons and/or one or more mixed hydrocarbons suitable for blending into one or more fungible products including, but not limited to one or more olefins, one or more paraffins, one or more naphthenes, one or more aromatics, any combination thereof, or any mixture thereof. Illustrative catalysts can include, but are not limited to, one or more of the following: ZSM-11, ZSM-12, ZSM-23, ZSM-35, ZSM-38, metal impregnated catalysts, zeolites, faujasite zeolites, modified faujasite zeolites, Y-type zeolites, ultrastable Y-type zeolites (USY), rare earth exchanged Y-type zeolites (REY), rare earth exchanged ultrastable Y-type zeolites (REUSY), rare earth free Z-21, Socony Mobil #5 zeolite (ZSM-5), high activity zeolite catalysts, any combination thereof, or any mixtures thereof.

Another hydrocarbon feed or ("second hydrocarbon feed") can optionally be introduced via line 1014 to the riser reactor 1002 at any point or location or combination of points or locations. For example, the second hydrocarbon feed in line 1014 can be introduced at the same point or location as the first hydrocarbon feed in line 1008. In another example, such as the illustrated exemplary embodiment, the second hydrocarbon feed in line 1014 can be introduced to the riser reactor 1002 at a point or location downstream of the first hydrocarbon feed in line 1008. In one or more embodiments, the second hydrocarbon feed in line 1014 can be introduced simultaneously, sequentially, alternatively or in any other manner or frequency in relation to the first hydrocarbon feed in line 1008. The second hydrocarbon feed in line 1014, if present, can be the same or different than the first hydrocarbon feed.

The second hydrocarbon feed in line 1014 can be liquid or partially or completely vaporized prior to introduction to the riser reactor 1002. For example, the second hydrocarbon feed in line 1014 can be about 0 wt % or more, about 5 wt % or more, about 10 wt % or more, about 15 wt % or more, about 25 wt % or more, about 50 wt % or more, about 75 wt % or more, about 90 wt % or more, or about 99.9 wt % or more vaporized prior to introduction to the riser reactor 1002. The second hydrocarbon feed in line 1014 can be introduced to the riser reactor 1002 at ambient or elevated temperatures. For example, the second hydrocarbon feed in line 1014 can be at a temperature of about 40° C. or more, about 100° C. or more, about 200° C. or more, or about 370° C. or more.

The catalyst supplied via line 1010 can be introduced to the riser reactor 1002 at a rate proportionate to the first hydrocarbon feed, the second hydrocarbon feed, or a combination of the first and second hydrocarbon feeds. The catalyst-to-hydrocarbon feed weight ratio can be from a low of about 0.5:1 to about 15:1, about 1:1 to about 13:1, about 2:1 to about 12:1, about 3:1 to about 10:1, or about 3:1 to about 8:1. In one or more embodiments, the catalyst can be introduced to the riser reactor 1002 at a temperature above the temperature of the first mixture to provide heat for increasing the feed temperature to final reaction temperature and to sustain the endothermic cracking reactions. For example, the temperature of the catalyst can be from a low of about 500° C., about 525° C., or about 550° C. to a high of about 575° C., about 625° C., or about 650° C.

The first hydrocarbon feed and, if present, the second hydrocarbon feed, can crack, react, recombine, and/or otherwise convert in the presence of the catalyst within the riser 1002 to produce a mixture or effluent containing one or more cracked hydrocarbons. As the hydrocarbons present in the riser reactor 1002 convert to produce the cracked product, a portion of the first and second hydrocarbon feeds can deposit onto the catalyst as a layer of carbonaceous coke. The deposition of coke on the surface of the catalyst deactivates the catalyst, forming coke-covered catalyst. The coke-covered catalyst can exit the riser reactor 1002 suspended in the cracked mixture or effluent recovered via line 1016.

In at least one embodiment, the fuel or coke-producing value of the second hydrocarbon feed in line 1014 can be sufficient to maintain the desired temperature within the riser reactor 1002. In one or more embodiments, the temperature of the catalyst introduced to the riser reactor 1002 can be adjusted by varying the deposition of coke onto the catalyst. The quantity of coke deposited on the catalyst can be adjusted, for example, by varying the second hydrocarbon feed to the reactor 1002. The amount of coke deposited onto the catalyst can be from a low of about 0.1 wt %, about 0.5 wt %, about 1 wt %, about 1.5 wt %, or about 2 wt % to a high of about 3 wt %, about 4 wt %, about 7 wt %, about 10 wt %, about 12 wt %, or about 15 wt %, based on the weight of the coked catalyst.

Operation of the riser reactor 1002 can favor the cracking and/or other conversion of the first hydrocarbon feed and, if present, the second hydrocarbon feed into one or more cracked hydrocarbons via line 1016 as a mixture or effluent. The mixture or effluent in line 1016 can have a solids concentration of from about 500 ppmw to about 98 wt %, about 2,500 ppmw to about 75 wt %, about 1 wt % to about 50 wt %, or from about 5 wt % to about 50 wt %.

The mixture or effluent in 1016 can be introduced to the disengager 1004. As shown in FIG. 10, the disengager 1004 can include one or more primary or "first" cyclones 1018, one or more secondary or "second" cyclones 1020, one or more plenums 1022, one or more strippers or "catalyst strippers" 1024, and one or more catalyst distributors 1026. Within the disengager 1004, the mixture or effluent can flow into the one or more first cyclones 1018 where at least a portion of the coke-covered catalyst can be selectively separated from the mixture or effluent. A cracked product can exit the one or more first cyclones 1018 via line 1028 and flow into the one or more second cyclones 1020 where additional coke-covered catalyst can be separated therefrom.

An effluent gas or cracked product can be recovered from the one or more plenums 1022 for withdrawal and subsequent fractionation and/or separation into one or more finished hydrocarbon products or other uses. The cracked product recovered from the plenum 1022 can include, but is not limited to, ethylene, propylene, butylene, other olefinic gases, benzene, toluene, xylene, gasoline, light cycle oil, heavy cycle oil, slurry oil, or any mixture thereof. In other embodiments the effluent gas or cracked product can be cooled to generate steam in a waste heat boiler (not shown), and routed to a quench tower (not shown) where at least a portion of any remaining entrained catalyst can be washed from the gases by contact with circulating quench oil. In yet other embodiments, the cracked product can be used as a supplemental fuel source in the regenerator 1004. The cracked product can have a solids concentration of from about 5 ppmw to about 5 wt %, about 10 ppmw to about 4 wt %, about 25 ppmw to about 3.5 wt %, or from about 50 ppmw to about 3 wt %.

The coke-covered catalyst separated from the second cracked mixture in the one or more first cyclones 1018 and the one or more second cyclones 1020 can be introduced to the one or more strippers 1024. Within the stripper 1024, one or more stripping fluids can be introduced and contacted with the coke-covered catalyst via one or more fluid distribution systems (two are shown) 1030. As is known in the art, the passage of a stripping fluid through the stripper 1024 can assist in removing any residual hydrocarbons entrained or entrapped within the coke-covered catalyst prior to regenerating the catalyst. As such, the stripping fluid can be adapted to strip one or more hydrocarbons from the coke-covered catalyst and carry it into one or more upper cyclones 1020 of the disengager 1004. Suitable stripping fluids can include, but are not limited to, steam, inert gases such as nitrogen and/or argon, or any mixture thereof.

If the stripping fluid includes steam, the steam supplied to the stripper 1024 via the one or more distribution systems 1030 can be saturated steam or superheated steam. For example, the steam introduced via the one or more distribution systems 1030 can be saturated steam having a minimum supply pressure of about 135 kPa, about 310 kPa, about 510 kPa, or about 720 kPa. In another example, the steam introduced via the one or more distribution systems 1030 can be superheated steam having a minimum superheat of about 15° C., about 30° C., about 45° C., about 60° C., or about 90° C.

In one or more embodiments, the one or more distribution systems 1030 can be or include the gas distribution system 700 and/or 800 discussed and described above with reference to FIGS. 7 and 8, respectively. Accordingly, the distribution system 1030 can also include one or more of the injection nozzles 100, 200, 300, 400, 500, and/or 600 discussed and described above with reference to FIGS. 1-6. For example, the fluid distribution system 1030 can include a header having a flow passage and a nozzle body coupled to the header. The nozzle body can have an inlet end in fluid communication with the flow passage and an outlet end positioned outside of the header. The outlet end can direct the steam into the catalyst stripper where the steam can contact the coked-catalyst. Contacting the coked-catalyst with the steam from the outlet end can at least partially remove any cracked hydrocarbons contained thereon or otherwise entrained with the coked-catalyst. The fluid distribution system 1030, e.g., the nozzle body, can also include and/or be at least partially covered with a heat resistant lining, such as a refractory lining, that can protect the fluid distribution system 1030 from thermal, chemical, or erosive attack during operation.

The coke-covered catalyst can flow from the stripper 1024 into a standpipe 1032 having a plug or slide valve 1034 located in a catalyst centerwell 1036. In exemplary operation, coke-covered catalyst can flow down the standpipe 1032 and pass through the catalyst plug valve 1034, whereupon the catalyst changes direction and flows upwardly through the annulus 1038 of the catalyst centerwell 1036 using a fluidization medium introduced via line 1040 to the catalyst centerwell 1036. In one or more embodiments, the fluidization medium, or gas, can be, for example, steam, an inert gas, and/or fuel gas.

The coke-covered catalyst can move through the annulus 1038 and can be diverted outwardly into a dense phase catalyst bed 1039 of the regenerator vessel 1006 via the one or more catalyst distributors 1026. In one or more embodiments, about 5 wt %, about 10 wt %, about 25 wt %, about 50 wt %, about 75 wt %, about 85 wt %, about 90 wt %, about 95 wt %, or about 99 wt % of the coke-covered catalyst in the standpipe 1032 can be introduced to the one or more regenerator vessels 1006 via the one or more catalyst distributors 1026.

The one or more regenerator vessels 1006 can include one or more fluid distributors or fluid distribution systems (two are shown) 1042, one or more regenerator cyclones 1044, and one or more regenerator plenums 1046. The fluid distributors 1042 can be configured to introduce a fluid capable of oxidizing and/or aerating the coked-catalyst within the dense phase catalyst bed 1039 of the regenerator 1006. The addition of an oxidant to the coke-covered catalyst discharged from the catalyst distributors 1026 can result in the oxidation and/or combustion of the coke on the surface of the catalyst into one or more waste gases including, but not limited to, carbon monoxide, carbon dioxide, hydrogen, water vapor, and/or mixtures thereof. In an exemplary embodiment, the combustion temperatures in the regenerator 1006 can be from about 600° C. to about 1,000° C., or about 650° C. to about 800° C., or about 675° C. to about 725° C.

The fluid distribution system 1042 can be or include the gas distribution system 700 and/or 800 discussed and describe above with reference to FIG. 7. The fluid distribution system 1042 can include one or more injection nozzles such as the injection nozzles 100, 200, 300, 400, 500, and/or 600 discussed and described above with reference to FIGS. 1-6.

The removal of the coke from the surface of the catalyst can re-expose the surface of the catalyst, thereby reactivating and/or regenerating the catalyst. All or at least a portion of the reactivated and/or regenerated catalyst can be recycled from the regenerator 1006 to the one or more riser reactors 1002 via valve 1050 disposed in line 1010. Moreover, all or at least a portion of fresh catalyst make-up can be added to the FCC system 1000 via addition to either the one or more riser reactors 1002 and/or the regenerator 1006.

The one or more waste gases generated by the oxidation and/or combustion of the coke can flow into the one or more regenerator cyclones 1044 wherein at least a portion of the catalyst suspended in the waste gases can be removed and returned to the regenerator 1006. The waste gases can exit the regenerator cyclones 1044 via one or more ducts 1052 to be collected in the regenerator plenum 1046, and thereafter directed for subsequent recovery, reuse, recycle, treatment, and/or disposal.

In applications using a light feedstock that can yield inadequate coke formation on the catalyst, and therefore provide insufficient heat of reaction to support the reactor heat demand, one or more embodiments of the disclosure can implement one or more heaters (not shown) configured to supplement the heat provided by coke combustion in the regenerator 1006. An illustrative heater that can be present within the regenerator 1006 can include the heaters discussed and described in U.S. Pat. No. 8,383,052. Also not shown, the regenerator 1006 can also include one or more torch nozzles.

Illustrative fluidized catalytic cracking processes, feedstocks, operation conditions, products, and other aspects thereof can include those discussed and described in U.S. Pat. Nos. 5,531,884; 5,598,219; 5,972,208; 6,503,460; 7,128,827; 7,144,498; 7,381,320; 7,491,315; 7,611,622; 7,820,033; 7,820,034; and 8,251,227; U.S. Patent Application Publication Nos. 2008/0035527; 2008/0083653; 2008/0230442; 2009/029118; 2009/0299119; 2011/0251046; 2011/0303582; and 2012/0165591; and EP Patent No.: EP0775183.

Prophetic Examples

Embodiments discussed and described herein can be further described with the following prophetic examples. Although the simulated examples are directed to specific embodiments, they are not to be viewed as limiting in any specific respect.

FIGS. 11-15 and 17 are derived from computational fluid dynamics ("CFD") simulations that are widely used to simulate gas and/or liquid flow fields. To generate the results depicted in FIGS. 11-15, the gas flow rate is set at 1.39 $ft^3$/sec, the temperature is set at 376° F., the pressure is set at 51.8 psia, the gas density is set at 0.167 lb/$ft^3$, the gas viscosity is set at 0.0254 CR: the gas specific heat is set at 0.245 Btu/lb-° R, and the gas thermal conductivity is set at 0.0213 Btu/hr-ft-° R.

Figure 11A:
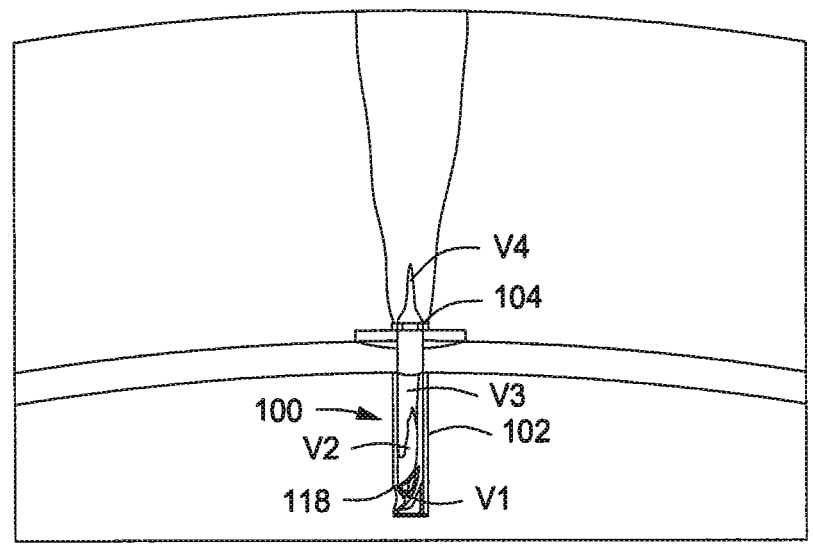
FIG. 11A depicts the cross-sectional view and FIG. 11B depicts the outlet end view of simulated flow through the nozzle shown in FIG. 1.
Figure 11B:
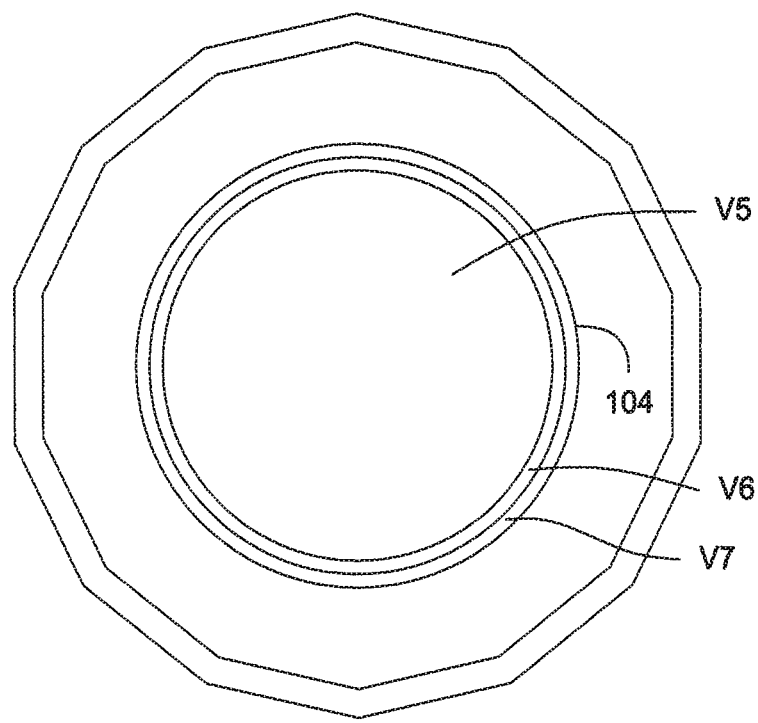

FIGS. 11A and 11B depict the CFD results for a nozzle constructed in accordance with the embodiment shown in FIG. 1. To generate the results depicted in FIGS. 11A and 11B, the nozzle body length (L) is set to 178 mm, the nozzle body diameter (D) is set to 30 mm, the intermediate orifice diameter ($D_o$) is set to 30 mm, and the intermediate orifice location ($L_o$) is set to 15 mm. Selected flow velocity magnitudes (in ft/s) are shown in Table 1 below.

TABLE 1

| | Velocity Magnitude (ft/s) |
|---|---|
| $V_1$ | 326 |
| $V_2$ | 100 |
| $V_3$ | 200 |
| $V_4$ | 181 |

TABLE 1-continued

| | Velocity Magnitude (ft/s) |
|---|---|
| $V_5$ | 181 |
| $V_6$ | 163 |
| $V_7$ | 100 |

FIG. 11A depicts a cross-sectional view of the simulated flow through the nozzle 102. Highly uneven velocities are seen in the area where the flow enters from the orifice 118. As the combined flow moves through nozzle body 102, the flow velocity is substantially even across the nozzle body 102, as compared with the Borda Tube of FIG. 17A. FIG. 11B depicts an end view of the simulated flow from the outlet end 104 and shows that the flow velocity is substantially uniform across the outlet end 104, as compared with the Borda Tube of FIG. 17B.

Figure 12A:
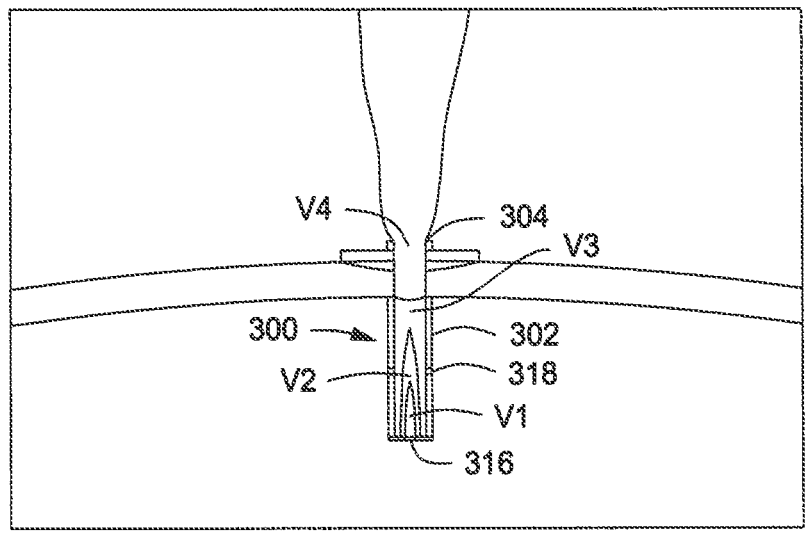
FIG. 12A depicts the cross-sectional view and FIG. 12B depicts the outlet end view of simulated flow through the nozzle shown in FIG. 3.
Figure 12B:
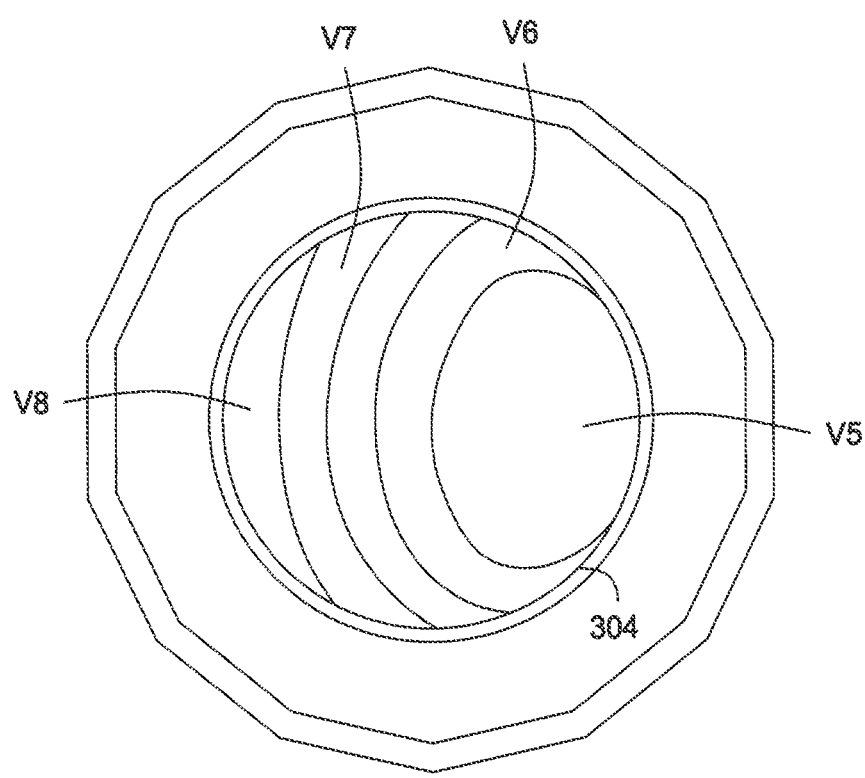

FIGS. 12A and 12B depict the CFD results for a nozzle constructed in accordance with the embodiment shown in FIG. 3. To generate the results depicted in FIGS. 12A and 12B, the nozzle body length (L) is set to 178 mm, the nozzle body diameter (D) is set to 30 mm, the inlet orifice diameter ($D_i$) is set to 21.5 mm, the intermediate orifice diameter ($D_o$) is set to 4 mm, and the intermediate orifice location ($L_o$) is set to 57 mm. There were 4 intermediate orifices equally spaced about the circumference of the nozzle body. Selected flow velocity magnitudes (in ft/s) are shown in Table 2 below.

TABLE 2

| | Velocity Magnitude (ft/s) |
|---|---|
| $V_1$ | 450 |
| $V_2$ | 315 |
| $V_3$ | 248 |
| $V_4$ | 202 |
| $V_5$ | 202 |
| $V_6$ | 192 |
| $V_7$ | 162 |
| $V_8$ | 152 |

FIG. 12A depicts a cross-sectional view of the simulated flow through the nozzle 300. As flow enters the inlet orifice 316, high flow velocities are offset toward one side of the nozzle body 302. As additional flow enters the nozzle body 302 through the intermediate orifices 318, the combined flow becomes more centered and uniform within the nozzle body 302, as compared with the Borda Tube of FIG. 17A. FIG. 12B depicts an end view of the simulated flow from the outlet end 304 and shows that the flow velocity is higher on one side of the outlet but there is a minimal velocity gradient across the outlet end 304, as compared with the Borda Tube of FIG. 17B.

Figure 13A:
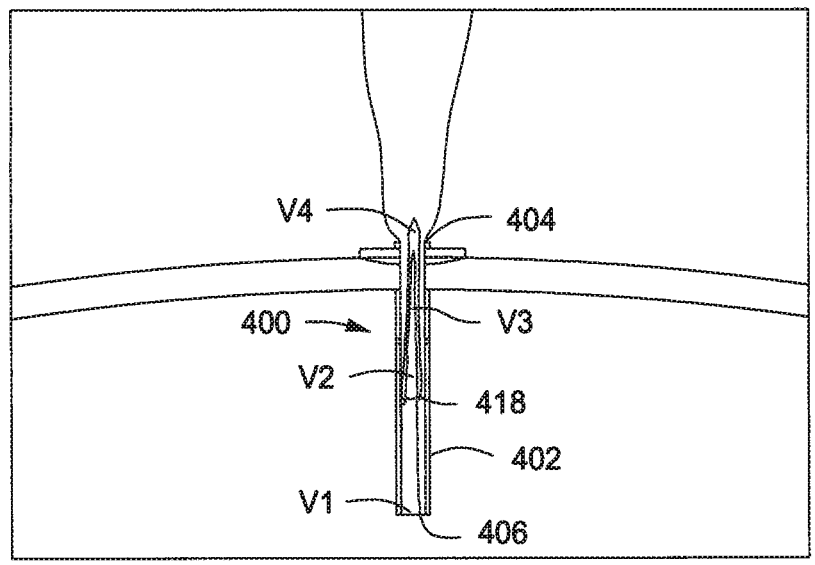
FIG. 13A depicts the cross-sectional view and FIG. 13B depicts the outlet end view of simulated flow through the nozzle shown in FIG. 4.
Figure 13B:
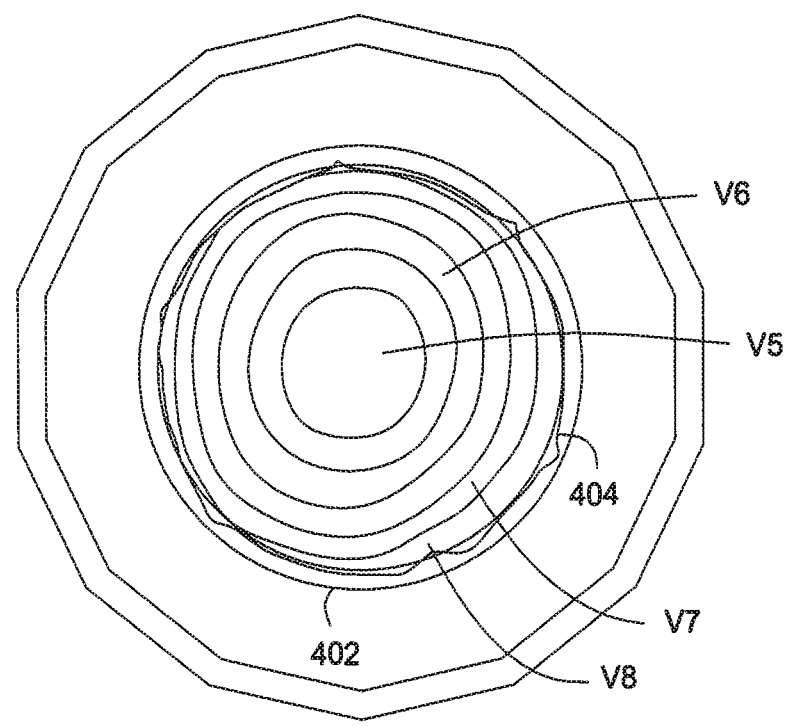

FIGS. 13A and 13B depict the CFD results for a nozzle constructed in accordance with the embodiment shown in FIG. 4. To generate the results depicted in FIGS. 13A and 13B, the nozzle body length (L) is set to 328 mm, the nozzle body diameter (D) is set to 30 mm, the intermediate orifice diameter ($D_o$) is set to 23 mm, and the intermediate orifice location ($L_o$) is set to 153 mm and positioned substantially centered within the nozzle body. Selected flow velocity magnitudes (in ft/s) are shown in Table 3 below.

TABLE 3

| | Velocity Magnitude (ft/s) |
|---|---|
| $V_1$ | 244 |
| $V_2$ | 407 |

TABLE 3-continued

| | Velocity Magnitude (ft/s) |
|---|---|
| $V_3$ | 285 |
| $V_4$ | 224 |
| $V_5$ | 224 |
| $V_6$ | 202 |
| $V_7$ | 179 |
| $V_8$ | 100 |

FIG. 13A depicts a cross-sectional view of the simulated flow through the nozzle 400. As flow enters the inlet end 406, high flow velocities are offset toward one side of the nozzle body 402. As the flow passes through the intermediate orifice 418, the high flow velocities become more centered within the nozzle body 402, as compared with the Borda Tube of FIG. 17A. FIG. 13B depicts an end view of the simulated flow from the outlet end 404 and shows that the maximum velocity is substantially centered within the outlet end 404, as compared with the Borda Tube of FIG. 17B, with a substantially consistent velocity gradient moving outward toward the wall of the nozzle body 402.

Figure 14A:
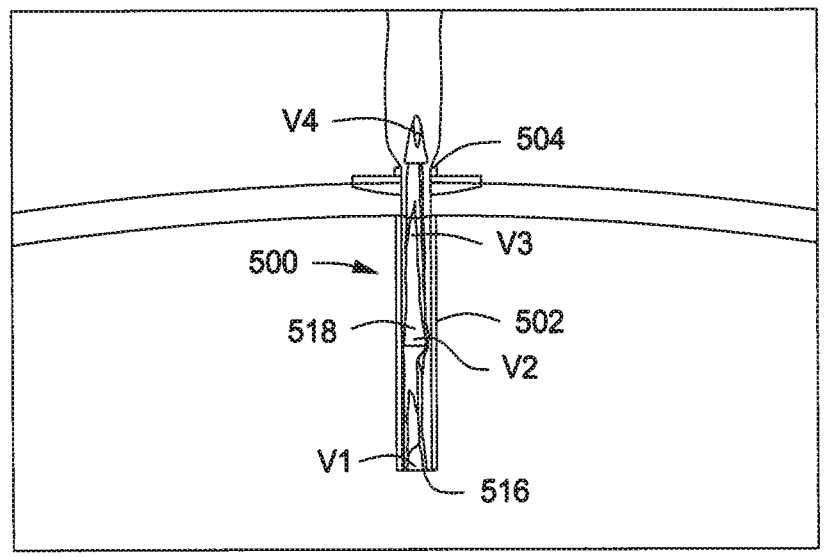
FIG. 14A depicts the cross-sectional view and FIG. 14B depicts the outlet end view of simulated flow through the nozzle shown in FIG. 5.
Figure 14B:
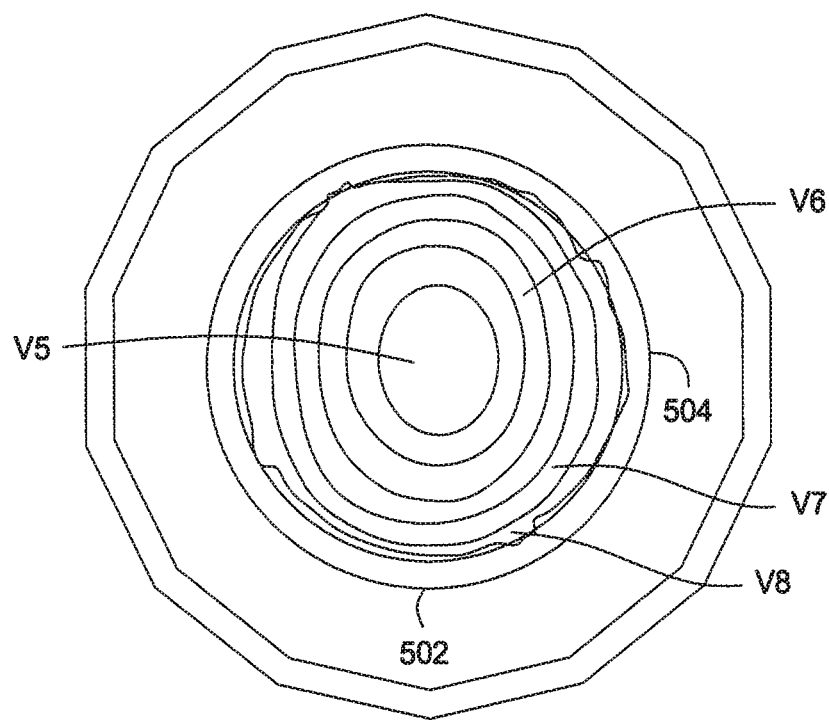

FIGS. 14A and 14B depict the CFD results for a nozzle constructed in accordance with the embodiment shown in FIG. 5. To generate the results depicted in FIGS. 14A and 14B, the nozzle body length L is set to 298 mm, the nozzle body diameter (D) is set to 30 mm, the inlet orifice diameter ($D_i$) is set to 16.3 mm, the intermediate orifice diameter ($D_o$) is set to 16.3 mm, and the intermediate orifice location ($L_o$) is set to 120 mm and positioned substantially centered within the nozzle body. Selected flow velocity magnitudes (in ft/s) are shown in Table 4 below.

TABLE 4

| | Velocity Magnitude (ft/s) |
|---|---|
| $V_1$ | 345 |
| $V_2$ | 311 |
| $V_3$ | 276 |
| $V_4$ | 220 |
| $V_5$ | 220 |
| $V_6$ | 198 |
| $V_7$ | 176 |
| $V_8$ | 100 |

FIG. 14A depicts a cross-sectional view of the simulated flow through the nozzle 500. As flow enters the inlet orifice 516, the maximum flow velocity is offset toward one side of the nozzle body 502. As the flow passes through the intermediate orifice 518, the flow becomes more centered and uniform within the nozzle body 502, as compared with the Borda Tube of FIG. 17A. FIG. 14B depicts an end view of the simulated flow from the outlet end 504 and shows that the maximum velocity is substantially centered within the outlet end 504, as compared with the Borda Tube of FIG. 17B, with a substantially uniform velocity gradient moving outward toward the wall of the nozzle body 502.

Figure 15A:
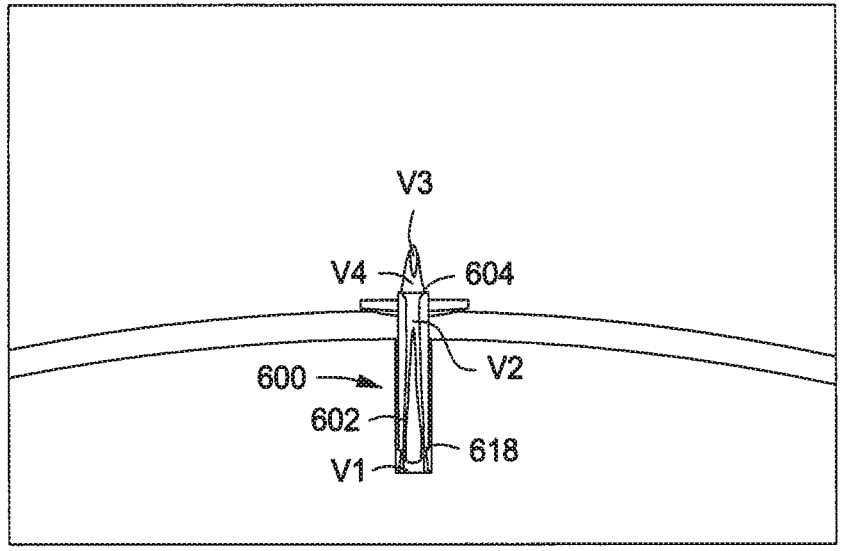
FIG. 15A depicts the cross-sectional view and FIG. 15B depicts the outlet end view of simulated flow through the nozzle shown in FIG. 6.
Figure 15B:
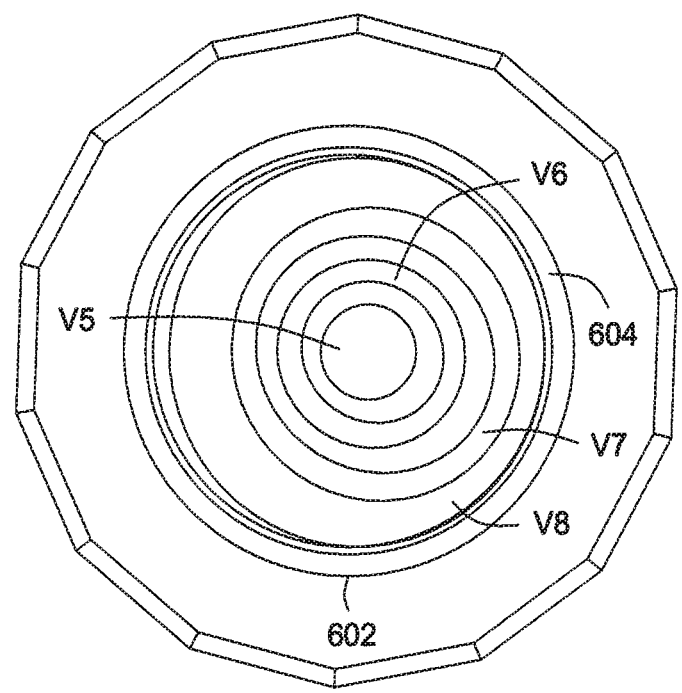

FIGS. 15A and 15B depict the CFD results for a nozzle constructed in accordance with the embodiment shown in FIG. 6. To generate the results depicted in FIGS. 15A and 15B, the nozzle body length (L) is set to 208 mm, the nozzle body diameter (D) is set to 30 mm, the intermediate orifice diameter ($D_o$) is set to 20.2 mm, the intermediate orifice location ($L_o$) is set to 30 mm and positioned substantially centered within the nozzle body, and the nozzle body is tapered at an angle α of 9.3°. Selected flow velocity magnitudes (in ft/s) are shown in Table 5 below.

TABLE 5

| | Velocity Magnitude (ft/s) |
|---|---|
| $V_1$ | 241 |
| $V_2$ | 290 |
| $V_3$ | 220 |
| $V_4$ | 249 |
| $V_5$ | 249 |
| $V_6$ | 224 |
| $V_7$ | 174 |
| $V_8$ | 124 |

FIG. 15A depicts a cross-sectional view of the simulated flow through the nozzle 600. As flow moves through the tapered section of the nozzle body 602, the flow velocity is substantially centered within the nozzle body 602. As the flow passes through the intermediate orifice 618, the velocity of the flow at the center of the nozzle body 602 increases, as compared with the Borda Tube of FIG. 17A. FIG. 15B depicts an end view of the simulated flow from the outlet end 604 and shows that the maximum velocity is substantially centered within the outlet end 604, as compared with the Borda Tube of FIG. 17B, with a substantially uniform gradient moving outward toward the wall of the nozzle body 602.

Figure 16:
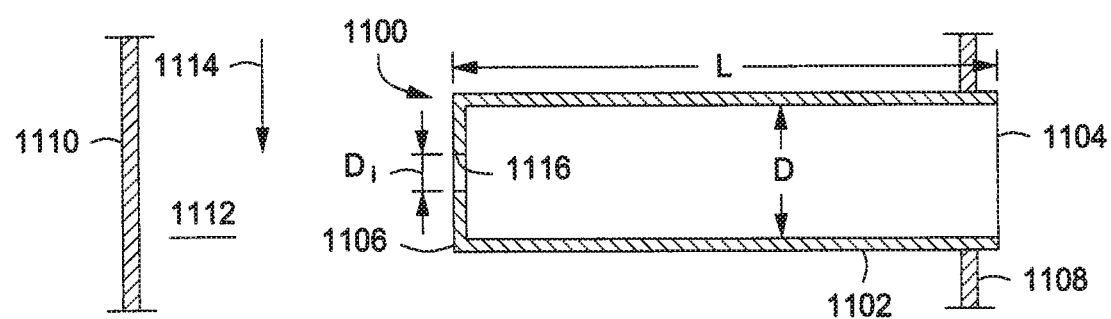
FIG. 16 depicts a sectional view of a Borda tube nozzle.

FIG. 16 depicts an illustrative Borda Tube injection nozzle 1100 as is known in the prior art. The injection nozzle 1100 includes a nozzle body 1102 having an outlet end 1104 and an inlet end 1106. The nozzle body 1102 extends through and is coupled to a wall 1108 of a header 1110 so that the outlet end 1104 is outside of the header 1110. The inlet end 1106 of the nozzle body 1102 is positioned in a flow passage 1112 of the header 1110 so that the longitudinal axis of the nozzle body 1102 is substantially perpendicular to the direction of flow 1114 through the flow passage 1112.

Figure 17A:
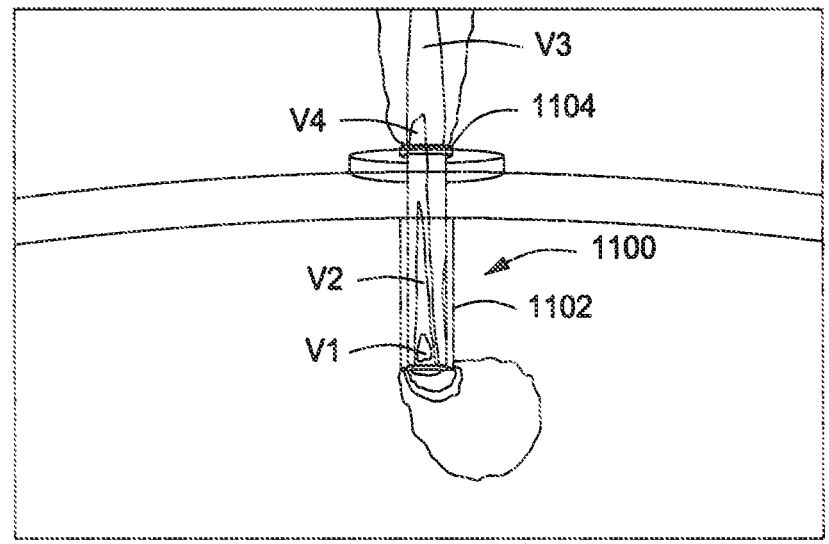
FIG. 17A depicts the cross-sectional view and FIG. 17B depicts the outlet end view of simulated flow through the nozzle shown in FIG. 16.
Figure 17B:
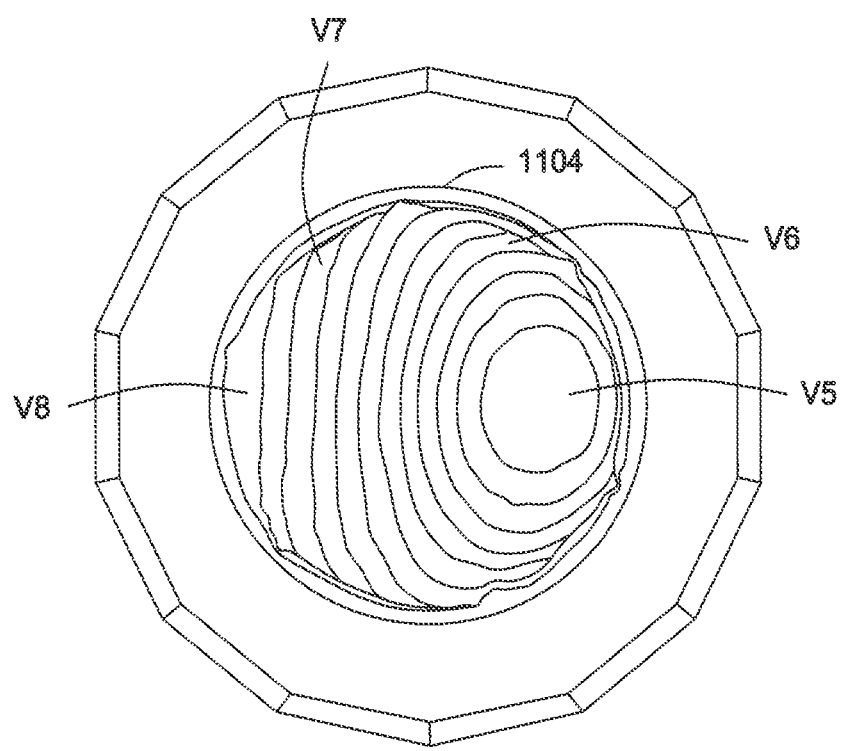

FIGS. 17A and 17B depict the CFD results for a prior art Borda Tube nozzle constructed in accordance with the embodiment shown in FIG. 16. To generate the results depicted in FIGS. 17A and 17B, the nozzle body length (L) is set to 178 mm, the inlet orifice diameter ($D_i$) is set to 23 mm, and the nozzle body diameter (D) is set to 30 mm. FIG. 17A depicts a cross-sectional view of the simulated flow through the nozzle 1100. As flow moves through the nozzle body 1102 it is generally offset toward the downstream side of the nozzle body. FIG. 17B depicts an end view of the simulated flow from the outlet end 1104 and shows that the maximum velocity is substantially offset toward one side of the outlet end 1104 with a steep gradient across the outlet end 1104. Selected flow velocity magnitudes (in ft/s) are shown in Table 6 below.

TABLE 6

| | Velocity Magnitude (ft/s) |
|---|---|
| $V_1$ | 443 |
| $V_2$ | 310 |
| $V_3$ | 177 |
| $V_4$ | 257 |
| $V_5$ | 257 |
| $V_6$ | 218 |
| $V_7$ | 167 |
| $V_8$ | 115 |

Embodiments discussed and described herein further relate to any one or more of the following paragraphs:

1. A gas distribution system, comprising: a header having a flow passage; and a nozzle body coupled to the header, wherein the nozzle body has an inlet end in fluid communication with the flow passage and an outlet end positioned outside of the header, wherein the nozzle body has a longitudinal axis that is substantially perpendicular to a direction of flow through the flow passage; and wherein the nozzle body has an orifice positioned between the inlet end and the outlet end.

2. The gas distribution system according to paragraph 1, wherein the inlet end defines an inlet orifice.

3. The gas distribution system according to paragraph 2, wherein the orifice positioned between the inlet end and the outlet end is defined by a wall of the nozzle body.

4. The gas distribution system according to any one of paragraphs 1 to 3, wherein the orifice positioned between the inlet end and the outlet end is positioned on a downstream side of the nozzle body.

5. The gas distribution system according to any one of paragraphs 1 to 4, wherein the orifice positioned between the inlet end and the outlet end is positioned within the nozzle body.

6. The gas distribution system according to paragraph 5, wherein a wall of the nozzle body tapers inward from the inlet end to the intermediate orifice.

7. The gas distribution system according to paragraph 5, wherein the inlet end defines an inlet orifice.

8. A method for distributing gas comprising: introducing a gas into a header having a flow passage; flowing the gas through the flow passage and into a nozzle body that extends through a wall of the header and into the flow passage, wherein the nozzle body has a longitudinal axis that is substantially perpendicular to the direction of flow through the flow passage; and flowing the gas through an outlet end of the nozzle body that is positioned outside of the header, wherein the nozzle body has an orifice positioned between an inlet end and the outlet end.

9. The method according to paragraph 8, wherein a first portion of the gas flows into the nozzle body through an inlet orifice defined by the inlet end and a second portion of the gas flows into the nozzle body through the orifice positioned between the inlet end and the outlet end.

10. The method according to paragraph 8 or 9, wherein the orifice positioned between the inlet end and the outlet end is positioned on a downstream side of the nozzle body.

11. The method according to any one of paragraphs 8 to 10, wherein the nozzle body comprises at least two orifices defined by a wall of the nozzle body and positioned between the inlet end and the outlet end.

12. The method according to any one of paragraphs 8 to 11, wherein the orifice positioned between the inlet end and the outlet end is positioned within the nozzle body.

13. The method according to paragraph 12, wherein the nozzle body has an inner surface that tapers inward from the inlet end to the orifice positioned between the inlet end and the outlet end.

14. A catalyst regenerator comprising: a regenerator vessel; a coked-catalyst inlet coupled to the regenerator vessel and in fluid communication with a reactor; a regenerated catalyst outlet coupled to the regenerator vessel and in fluid communication with the reactor; a waste gas outlet coupled to the regenerator vessel; and a gas distribution system coupled to the regenerator vessel and in fluid communication with a supply of an oxidant, wherein the gas distribution system comprises: a header having a flow passage; a nozzle body coupled to the header and having an inlet end in fluid communication with the flow passage and an outlet end positioned outside of the header, wherein the nozzle body has a longitudinal axis that is substantially perpendicular to a direction of flow through the flow passage; and an orifice positioned between the inlet end and the outlet end.

15. The catalyst regenerator according to paragraph 14, wherein the inlet end defines an inlet orifice.

16. The catalyst regenerator according to paragraph 14 or 15, wherein the orifice positioned between the inlet end and the outlet end is defined by a wall of the nozzle body.

17. The catalyst regenerator according to any one of paragraphs 14 to 16, wherein the orifice positioned between the inlet end and the outlet end is positioned on a downstream side of the nozzle body.

18. The catalyst regenerator according to any one of paragraphs 14 to 17, wherein the orifice positioned between the inlet end and the outlet end is positioned within the nozzle body.

19. The catalyst regenerator according to paragraph 18, wherein a wall of the nozzle body tapers inward from the inlet end to the orifice positioned between the inlet end and the outlet end.

20. The catalyst regenerator according to paragraph 18 or 19, wherein the inlet end defines an inlet orifice.

21. A method for distributing a stripping fluid, comprising: introducing a stripping fluid into a header having a flow passage; flowing the stripping fluid through the flow passage and into a nozzle body that extends through a wall of the header and into the flow passage, wherein the nozzle body has a longitudinal axis that is substantially perpendicular to the direction of flow through the flow passage; and flowing the gas through an outlet end of the nozzle body that is positioned outside of the header, wherein the nozzle body has an orifice positioned between an inlet end and the outlet end.

22. The method according to paragraph 21, wherein the stripping fluid comprises steam.

23. The method according to paragraph 21, wherein the stripping fluid comprises superheated steam.

24. The method according to paragraph 21, wherein the stripping fluid comprises saturated steam.

25. A method for contacting coked-catalyst with steam, comprising: contacting a coked-catalyst with steam from a gas distribution system, the gas distribution system, comprising: a header having a flow passage and a nozzle body coupled to the header, wherein the nozzle body has an inlet end in fluid communication with the flow passage and an outlet end positioned outside of the header, wherein the nozzle body has a longitudinal axis that is substantially perpendicular to a direction of flow through the flow passage; and wherein the nozzle body has an orifice positioned between the inlet end and the outlet end.

26. The method according to paragraph 25, wherein the coked-catalyst is contacted with the steam within a catalyst stripper, and wherein the catalyst stripper is in fluid communication with one or more separators adapted to separate a cracked mixture containing one or more cracked hydrocarbons and the coked-catalyst.

27. The method according to paragraph 25 or 26, wherein the stripping fluid comprises steam.

28. The method according to paragraph 25 or 26, wherein the stripping fluid comprises superheated steam.

29. The method according to paragraph 25 or 26, wherein the stripping fluid comprises saturated steam.

30. A catalyst regenerator, comprising: a regenerator housing containing a dense phase catalyst bed configured to receive a catalyst to be regenerated, wherein the catalyst is at least partially covered with a carbonaceous coke that is combusted to provide a heated catalyst; at least one stripper; and at least one gas distribution system, the gas distribution system comprising: a header having a flow passage and a nozzle body coupled to the header, wherein the nozzle body has an inlet end in fluid communication with the flow passage and an outlet end positioned outside of the header, wherein the nozzle body has a longitudinal axis that is substantially perpendicular to a direction of flow through the flow passage; and wherein the nozzle body has an orifice positioned between the inlet end and the outlet end.

31. The catalyst regenerator according to paragraph 30, wherein the gas distribution system is located within the dense phase catalyst bed.

32. The catalyst regenerator according to paragraph 30, wherein the gas distribution system is located within the stripper.

33. The catalyst regenerator according to any one of paragraphs 30 to 32, wherein the inlet end defines an inlet orifice.

34. The catalyst regenerator according to any one of paragraphs 30 to 32, wherein the orifice positioned between the inlet end and the outlet end is defined by a wall of the nozzle body.

35. The catalyst regenerator according to any one of paragraphs 30 to 34, wherein the orifice positioned between the inlet end and the outlet end is positioned on a downstream side of the nozzle body.

36. The catalyst regenerator according to any one of paragraphs 30 to 32, wherein the orifice positioned between the inlet end and the outlet end is positioned within the nozzle body.

37. The catalyst regenerator according to paragraph 36, wherein a wall of the nozzle body tapers inward from the inlet end to the intermediate orifice.

38. The catalyst regenerator according to any one of paragraphs 30 to 37, wherein the gas distribution system is adapted to introduce a stripping fluid into the stripper.

39. The method according to paragraph 38, wherein the stripping fluid comprises superheated steam.

40. The method according to paragraph 38, wherein the stripping fluid comprises saturated steam.

41. The catalyst regenerator according to any one of paragraphs 30 to 37, wherein the gas distribution system is adapted to introduce a fluid into the regenerator housing.

42. The method according to paragraph 41, wherein the fluid comprises one or more oxidants.

43. The method according to paragraph 42, wherein the fluid comprises air, oxygen, or a mixture thereof.

44. A fluidized catalytic cracking system, comprising: a riser reactor; a separator in fluid communication with the riser reactor; a stripper in fluid communication with the separator; a regenerator vessel; a coked-catalyst line to provide fluid communication between the regenerator vessel and the stripper; a regenerated catalyst line to provide fluid communication between the regenerator vessel and the riser reactor; a waste gas outlet coupled to the regenerator vessel; and at least one fluid distribution system in fluid communication with at least one of the stripper and the regenerator vessel and in fluid communication with a supply of a fluid, wherein the gas distribution system comprises: a header having a flow passage; a nozzle body coupled to the header and having an inlet end in fluid communication with the flow passage and an outlet end positioned outside of the header, wherein the nozzle body has a longitudinal axis that is substantially perpendicular to a direction of flow through the flow passage; and an orifice positioned between the inlet end and the outlet end.

45. The fluidized catalytic cracking system according to paragraph 44, wherein the fluid distribution system is in fluid communication with the stripper.

46. The fluidized catalytic cracking system according to paragraph 44, wherein the fluid distribution system is in fluid communication with the regenerator vessel.

47. The fluidized catalyst cracking system according to any one of paragraphs 44 to 46, wherein the inlet end defines an inlet orifice.

48. The fluidized catalyst cracking system according to any one of paragraphs 44 to 47, wherein the orifice positioned between the inlet end and the outlet end is defined by a wall of the nozzle body.

49. The fluidized catalyst cracking system according to any one of paragraphs 44 to 47, wherein the orifice positioned between the inlet end and the outlet end is positioned on a downstream side of the nozzle body.

50. The fluidized catalyst cracking system according to any one of paragraphs 44 to 47, wherein the orifice positioned between the inlet end and the outlet end is positioned within the nozzle body.

51. The fluidized catalyst cracking system according to paragraph 50, wherein a wall of the nozzle body tapers inward from the inlet end to the orifice positioned between the inlet end and the outlet end.

52. The fluidized catalyst cracking system according to paragraph 50, wherein the inlet end defines an inlet orifice.

53. The fluidized catalyst cracking system according to any one of paragraphs 44 to 52, wherein the fluid distribution system is configured to introduce air, oxygen, or a mixture thereof to the regenerator vessel.

54. The fluidized catalyst cracking system according to any one of paragraphs 44 to 52, wherein the fluid distribution system is configured to introduce steam to the stripper.

55. The fluidized catalyst cracking system according to any one of paragraphs 44 to 54, wherein a first fluid distribution system is in fluid communication with the regenerator vessel and a second fluid distribution system is in fluid communication with the stripper.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A gas distribution system, comprising:
a header having a flow passage contained therein; and
at least one nozzle body partially disposed within the flow passage, wherein:
the at least one nozzle body has a wall defining an inlet end positioned within the flow passage and in fluid communication with the flow passage and an outlet end positioned outside of the header;
the at least one nozzle body has a longitudinal axis that is substantially perpendicular to a direction of flow through the flow passage; and
the at least one nozzle body has an orifice formed radially through the wall and positioned between the inlet end and the outlet end to regulate fluid flow from the flow passage into the at least one nozzle body,
wherein the at least one nozzle body has an upstream side facing the direction of flow and a downstream side not facing the direction of flow and wherein the orifice positioned between the inlet end and the outlet end is positioned on the downstream side of the at least one nozzle body.

2. The gas distribution system of claim 1, wherein the inlet end defines an inlet orifice.

3. The gas distribution system of claim 1, wherein the fluid flows into the at least one nozzle body in a direction substantially perpendicular to the longitudinal axis of the at least one nozzle body.

4. The gas distribution system of claim 1, wherein the orifice is formed through an outer circumferential surface of the at least one nozzle body and wherein the fluid enters the at least one nozzle body only through the orifice.

5. The gas distribution system of claim 1, wherein:
the fluid flows into the at least one nozzle body in a direction substantially perpendicular to the longitudinal axis of the at least one nozzle body;
the orifice is formed through an outer circumferential surface of the at least one nozzle body; and
the fluid enters the at least one nozzle body only through the orifice.

6. The gas distribution system of claim 1, wherein the orifice is not positioned within the at least one nozzle body.

7. The gas distribution system of claim 2, wherein the fluid flow through the orifice is in a direction transverse to the longitudinal axis of the at least one nozzle body.

8. The gas distribution system of claim 2, wherein the fluid flow through the inlet orifice is transverse to the fluid flow through the orifice.

9. The gas distribution system of claim 2, wherein the fluid flow has a first portion and a second portion, and wherein only the first portion flows through the inlet orifice and only the second portion flows through the orifice.

10. The gas distribution system of claim 2, wherein:
the fluid flow through the inlet orifice is transverse to the fluid flow through the orifice;
the fluid flow has a first portion and a second portion; and
only the first portion flows through the inlet orifice and only the second portion flows through the orifice.

11. A method for distributing gas comprising:
introducing a gas into a header having a flow passage contained therein;
positioning a nozzle body in the flow passage, wherein the nozzle body has a wall defining an inlet end and an outlet end and an orifice formed through the wall, the orifice being positioned between the inlet end and the outlet end to regulate fluid flow from the flow passage into the nozzle body;

flowing the gas through the flow passage and into the nozzle body, wherein the nozzle body has a longitudinal axis that is substantially perpendicular to the direction of flow through the flow passage, wherein the gas enters the nozzle body radially through the orifice; and flowing the gas through an outlet end of the nozzle body that is positioned outside of the header, wherein the nozzle body has an upstream side facing the direction of flow and a downstream side not facing the direction of flow and wherein the orifice positioned between the inlet end and the outlet end is positioned on a downstream side of the nozzle body.

12. The method of claim 11, wherein a first portion of the gas flows into the nozzle body through an inlet orifice defined by the inlet end and a second portion of the gas flows into the nozzle body through the orifice positioned between the inlet end and the outlet end.

13. The method of claim 11, wherein the nozzle body comprises at least two orifices defined by a wall of the nozzle body and positioned between the inlet end and the outlet end.

14. A catalyst regenerator comprising:
a regenerator vessel;
a coked-catalyst inlet coupled to the regenerator vessel and in fluid communication with a reactor;
a regenerated catalyst outlet coupled to the regenerator vessel and in fluid communication with the reactor;
a waste gas outlet coupled to the regenerator vessel; and
a gas distribution system coupled to the regenerator vessel and in fluid communication with a supply of an oxidant, wherein the gas distribution system comprises:
the at least one nozzle body has a wall defining an inlet end positioned within the flow passage and in fluid communication with the flow passage and an outlet end positioned outside of the header;
the at least one nozzle body has a longitudinal axis that is substantially perpendicular to a direction of flow through the flow passage; and
the at least one nozzle body has an orifice formed radially through the wall and positioned between the inlet end and the outlet end to regulate fluid flow from the flow passage into the at least one nozzle body, wherein the at least one nozzle body has an upstream side facing the direction of flow and a downstream side not facing the direction of flow and wherein the orifice positioned between the inlet end and the outlet end is positioned on a downstream side of the at least one nozzle body.

15. The catalyst regenerator of claim 14, wherein the inlet end defines an inlet orifice.

* * * * *